Inventors
James H. Boicey
and Charles H. Cowley
By Nobbe & Swope
Attorneys

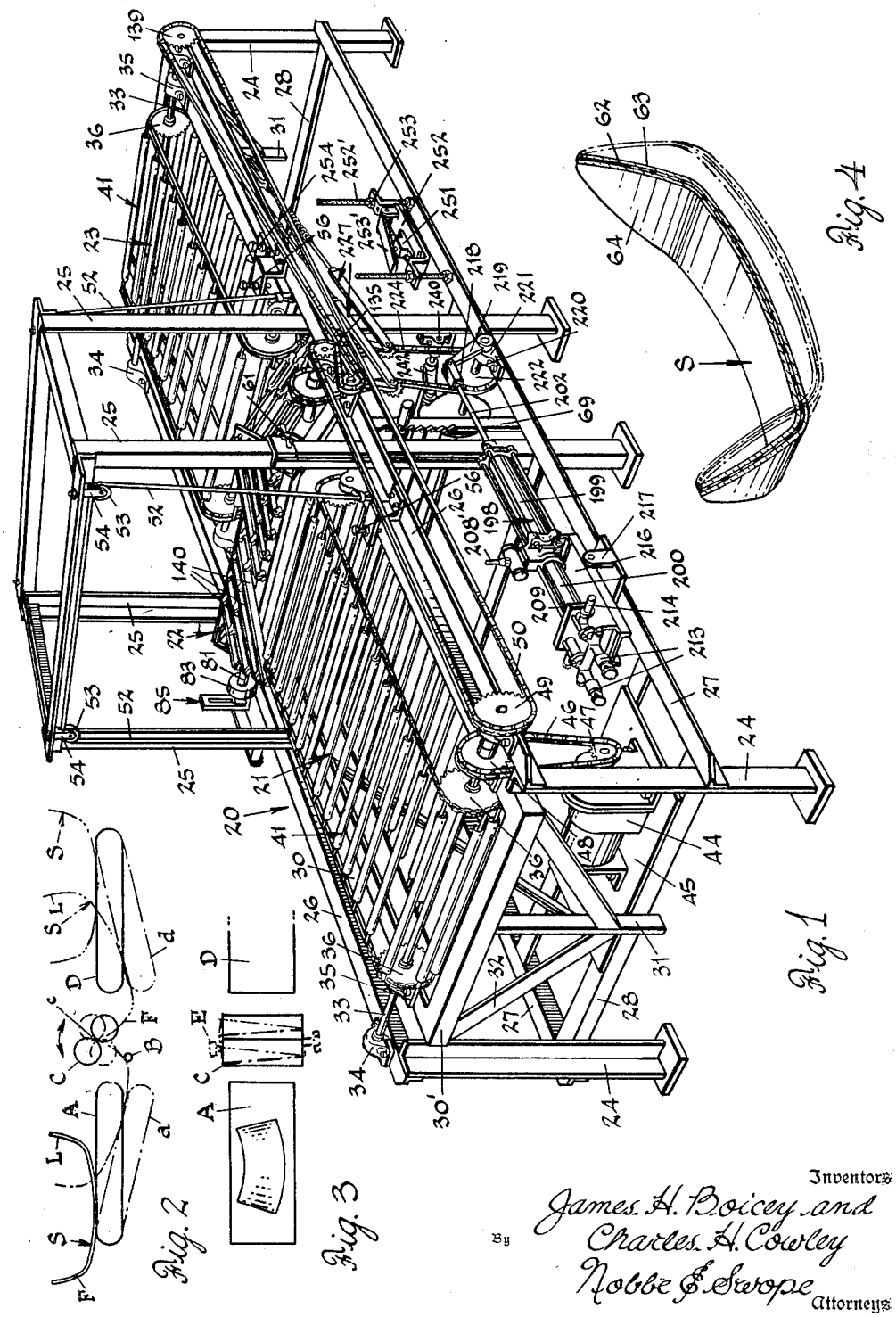

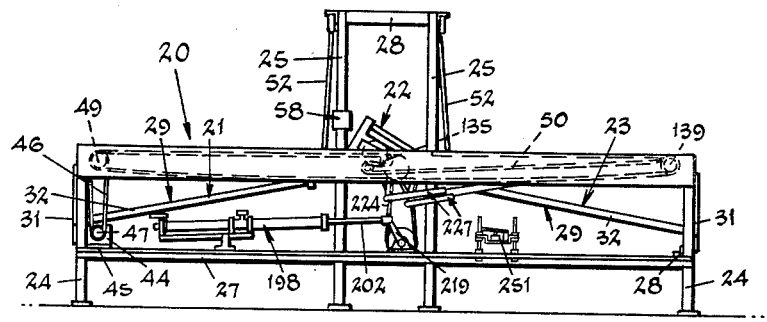
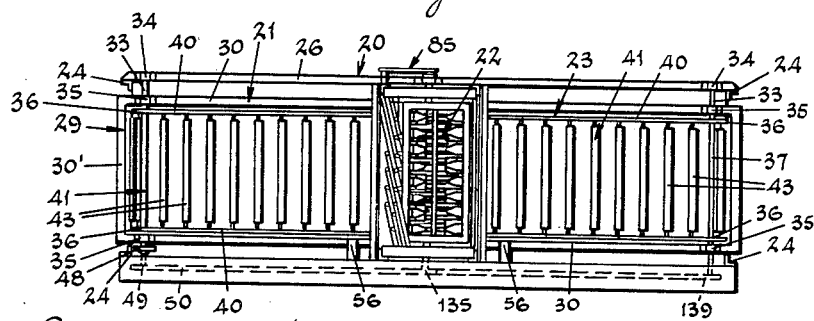
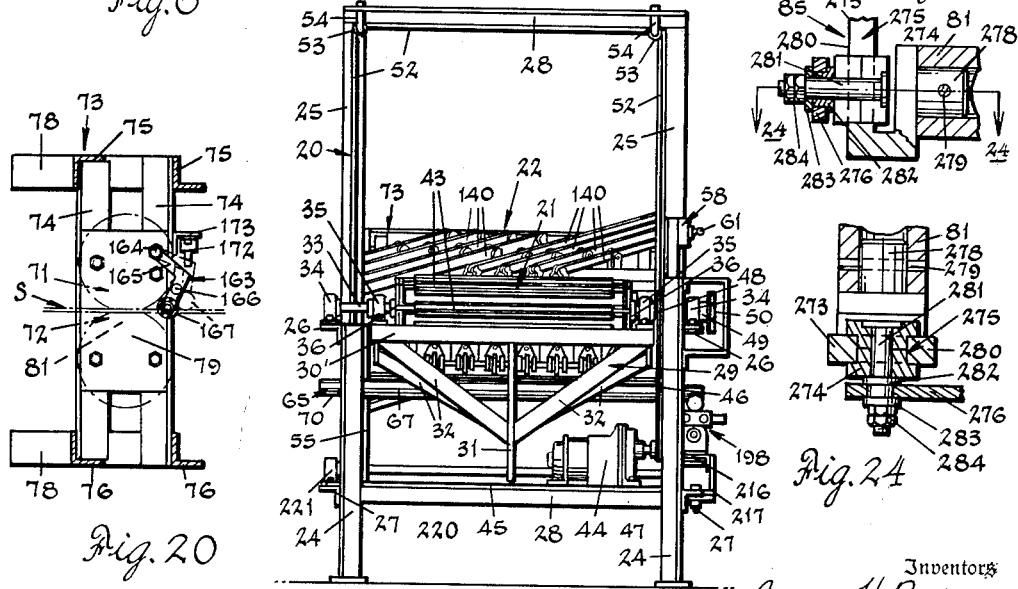

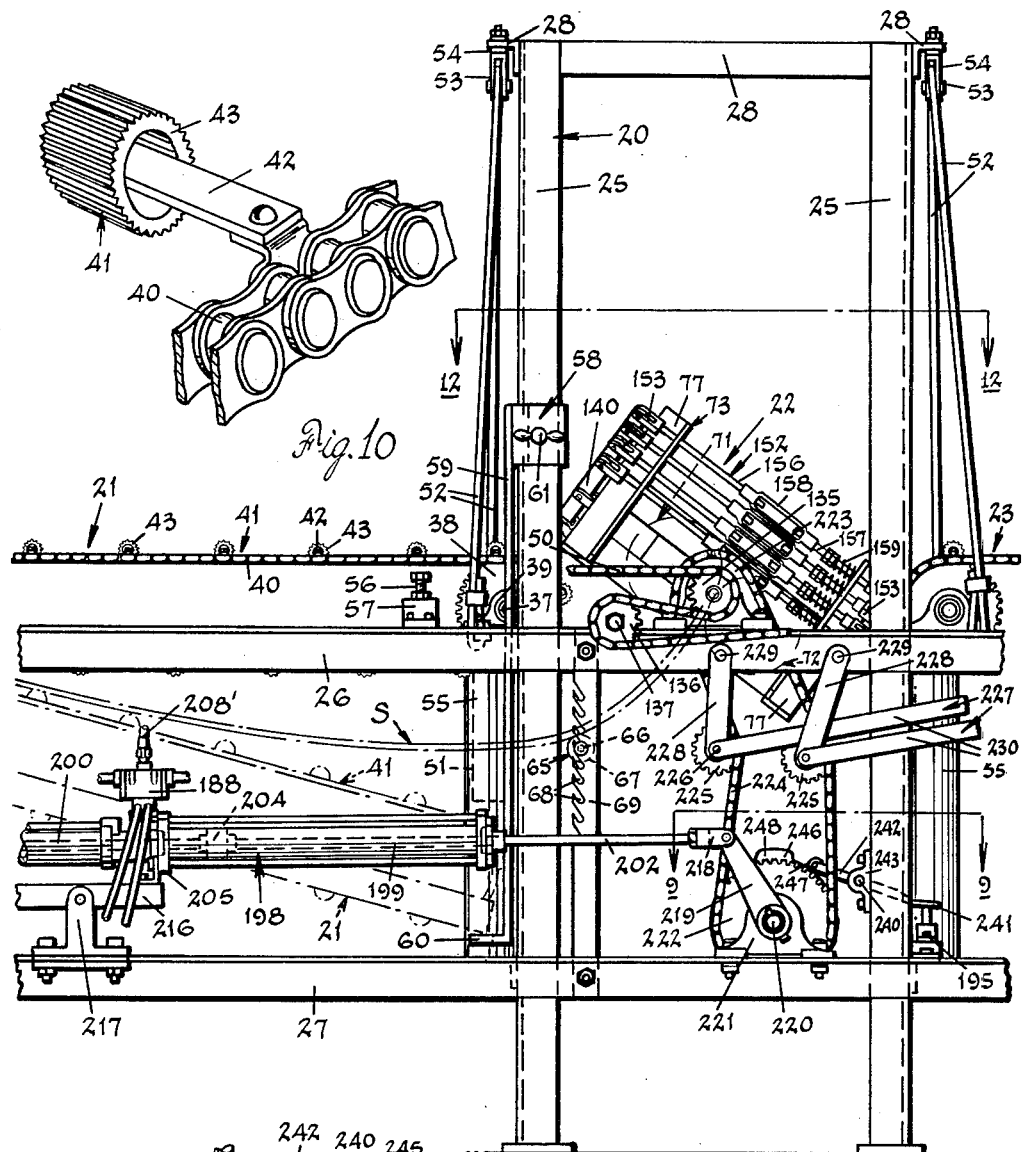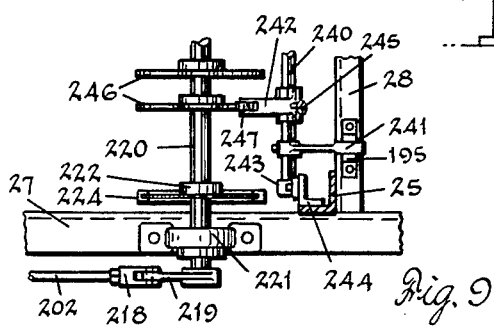

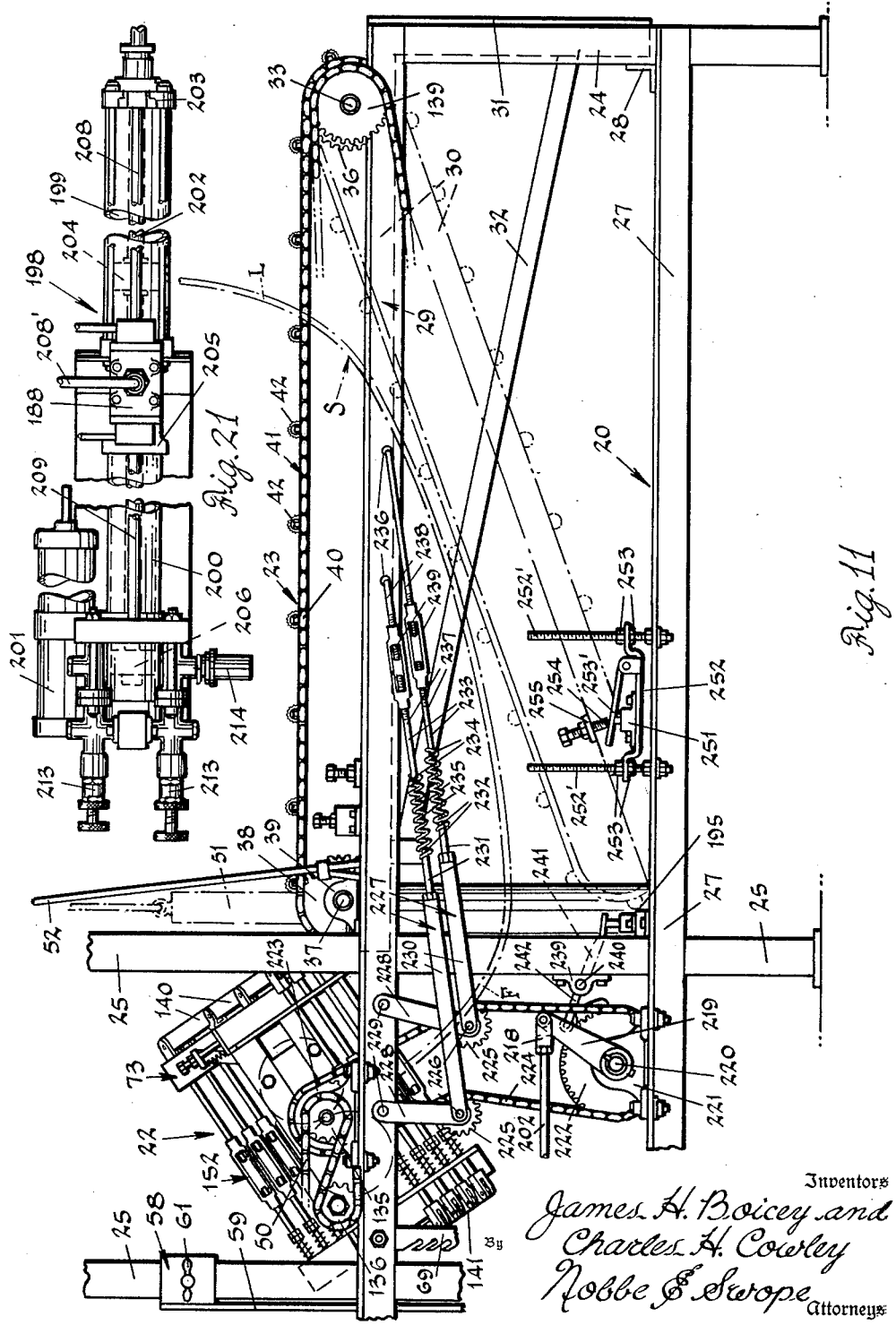

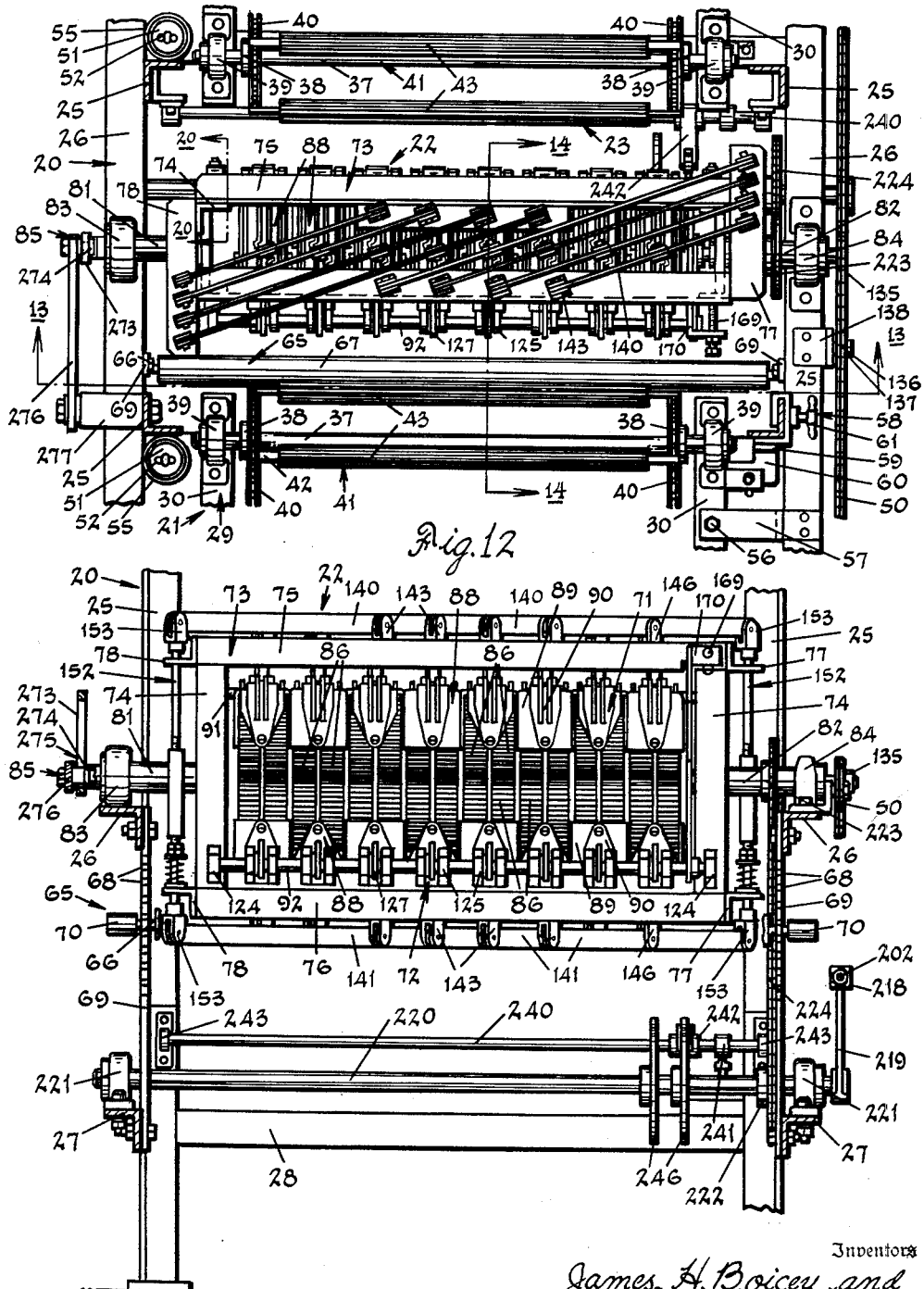

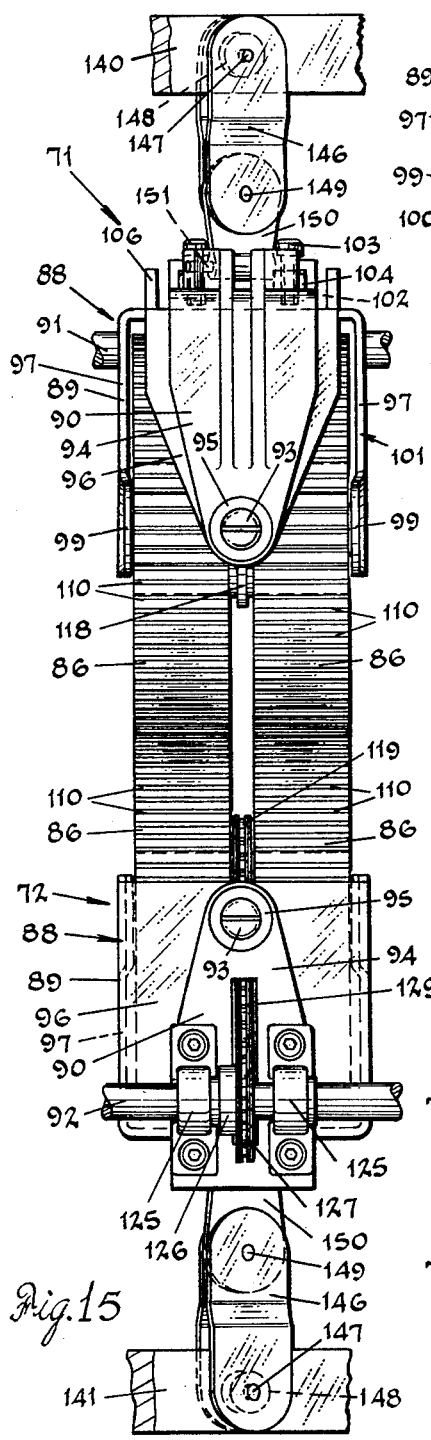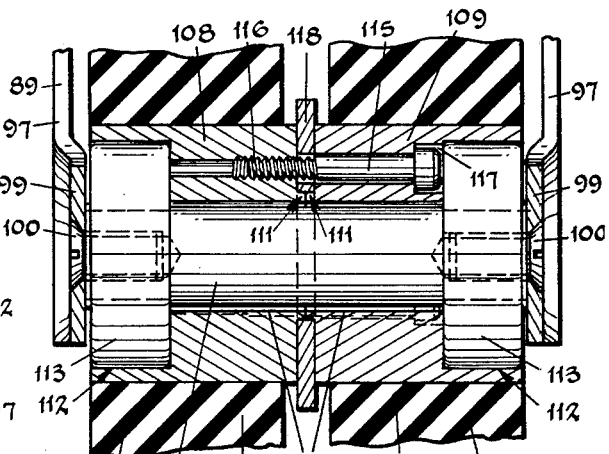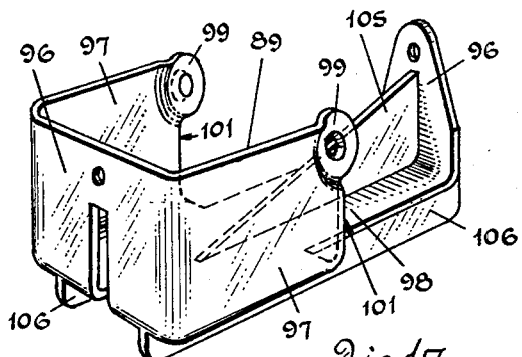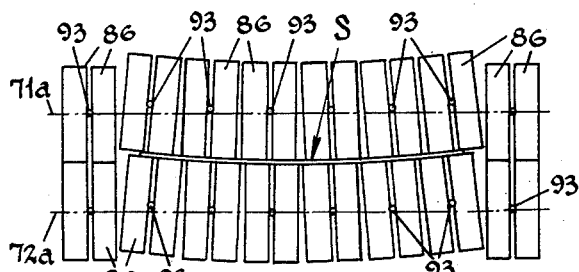

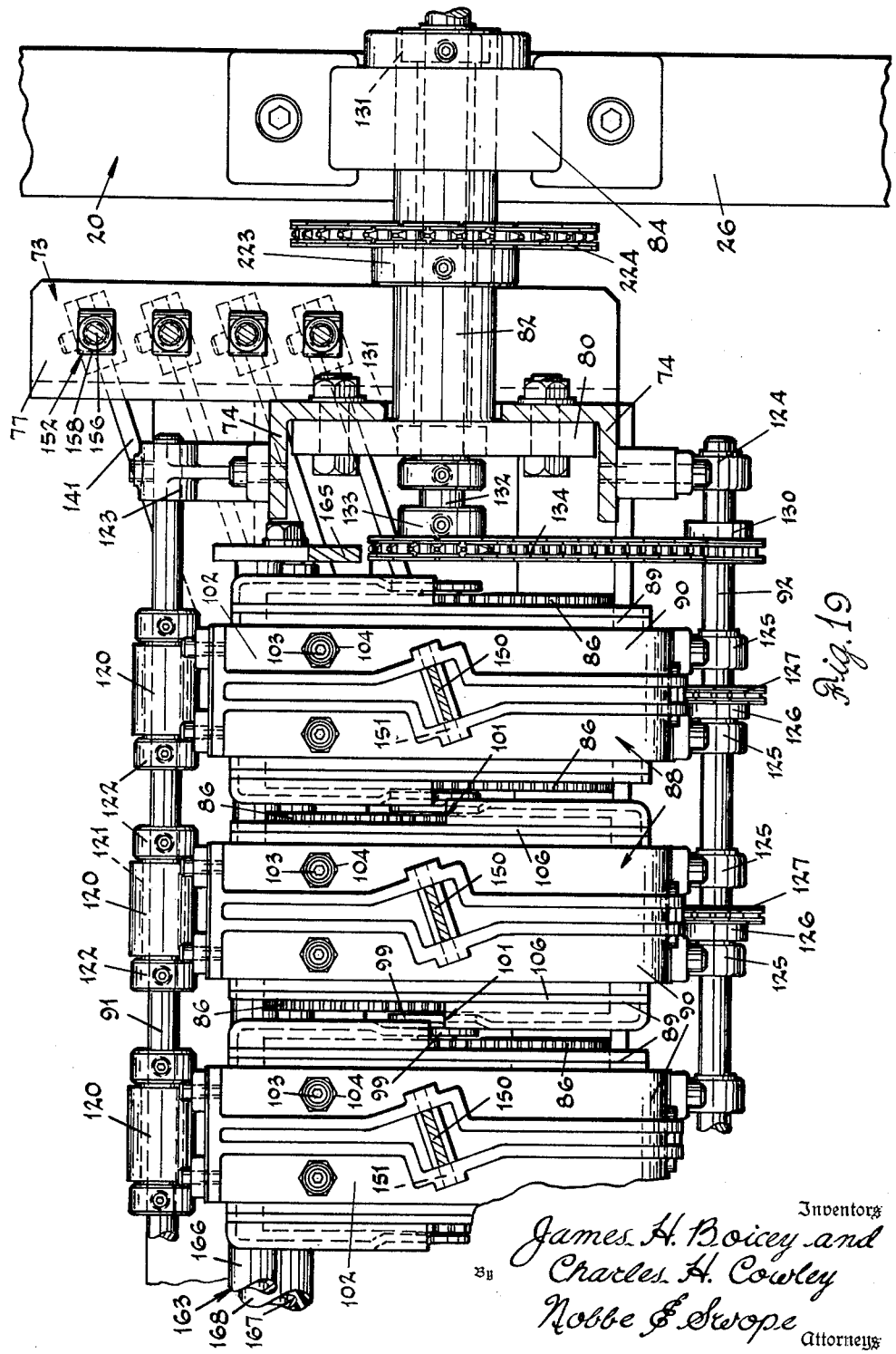

April 10, 1962 J. H. BOICEY ET AL 3,029,177
METHOD OF AND APPARATUS FOR PRESSING SHEETS
OF LAMINATED SAFETY GLASS
Original Filed April 8, 1953 9 Sheets-Sheet 9
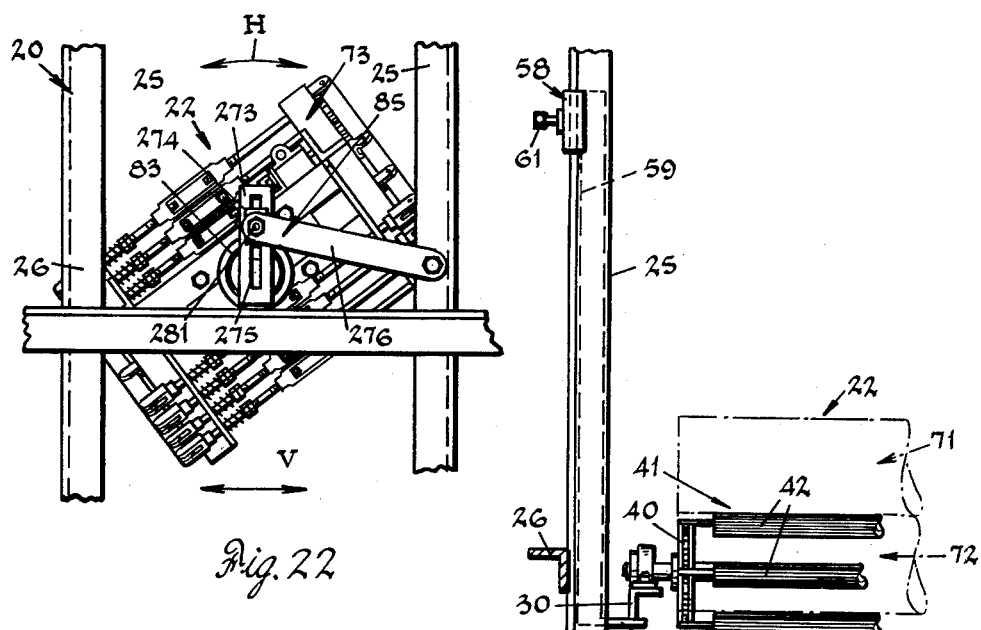
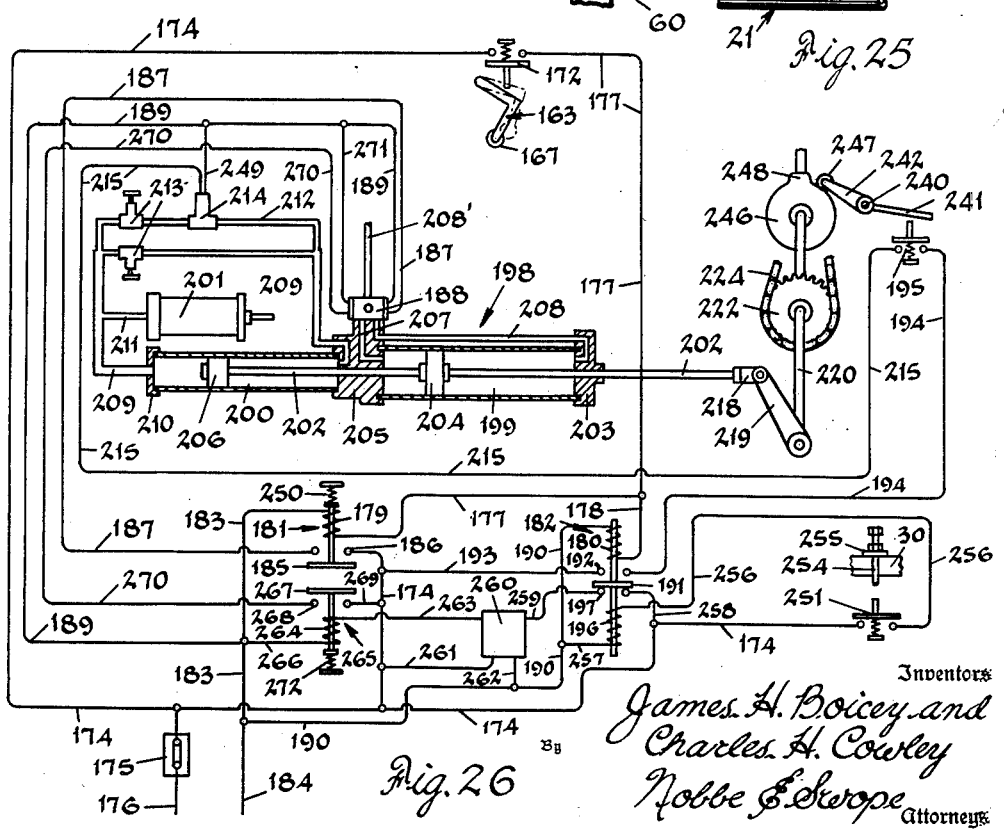
Inventors
James H. Boicey and
Charles H. Cowley
Nobbe & Swope
Attorneys

United States Patent Office 3,029,177
Patented Apr. 10, 1962

3,029,177
METHOD OF AND APPARATUS FOR PRESSING SHEETS OF LAMINATED SAFETY GLASS
James H. Boicey and Charles H. Cowley, Toledo, Ohio, assignors to Libbey-Owens-Ford Glass Company, Toledo, Ohio, a corporation of Ohio
Continuation of application Ser. No. 347,462, Apr. 8, 1953. This application July 23, 1959, Ser. No. 829,482
17 Claims. (Cl. 156—99)

This invention relates broadly to the pressing of laminated sheets such as of glass and plastic, plastics or like materials. More particularly, the invention has to do with an improved method and apparatus for pressing together laminations of glass sheets and an interlayer of plastic in a preliminary operation to the final sealing of the same by heat and pressure in an autoclave.

This application is a continuation of our co-pending application Serial No. 347,462, filed April 8, 1953, now abandoned.

In the manufacture of so-called laminated safety glass sheets, it is well-known that a composite structure or "sandwich" of two or more glass sheets and an interposed layer or layers of non-brittle thermoplastic should be initially pressed together to expel entrained air; assure surface contact between the opposed layers, and adequately seal the marginal edges thereabout. This preliminary pressing, or so-called "prepressing," operation is usually performed in order that during the final sealing in the presence of heated oil under pressure within an autoclave, the fluid will not enter at the edges of the glass sheets and plastic interlayer while at the same time it is subjecting the glass-plastic sandwich to sufficient pressure to bring about thorough and complete bonding of the related surfaces.

The pressing of flat and even slightly curved glass sheets ordinarily presents no unusual problem since the composited sandwiches thereof can be handled on substantially horizontally disposed conveyors leading to and away from the supporting structure of the pressing rolls. Where, however, the glass sheets are bent to curvatures of a more complex character, means must be devised to so support the glass-plastic sandwiches in carrying them forwardly that the leading areas thereof can be satisfactorily entered into and passed between the pressing rolls. In some instances, this has been accomplished in the prior art by orienting the pair of rolls in an angular plane; however, in such prior art structures, any modifying change to readily accommodate bent glass sheets of different curvatures or even flat glass has obviously necessitated a delay in the otherwise continuous operation of the pressing apparatus or of the production line in which it is situated.

Now, we have discovered that the glass sheets, whether flat or curved, can be initially supported and conveyed to the pressing rolls on a novelly constructed moving support that is adapted to angularly descend as the glass-plastic sandwich advances thereupon and present the same to said pressing rolls in a highly desirable manner. Further, it has been found that, by locating a substantially fixed element between the moving support and the pressing rolls, the sandwich will be caused to move over the surface of the element and along a predetermined path of orientation to enter between the rolls. This fixed element or surface thus becomes a focal point in the path of movement and, by changing its relation to the moving support and to the pressing rolls, the entire character of any operation can be instantly affected. Otherwise stated, when departure is made from the processing of a flat or a bent glass sandwich of one curvature to a bent glass of a differing curvature, an alteration in location of the fixed surface can determine the ensuing path of movement of the glass-plastic sandwiches and without an undesired delay.

More practically speaking, embodiments of our invention provide a conveyor so supported at one end and counter-balanced bodily that a glass-plastic sandwich carried thereon will cause the conveyor to descend or swing downwardly under the weight of the sandwich as the same is moved forwardly toward a pair of especially constructed pressing rolls. Between this conveyor and the pair of rolls, a fixed but adjustably supported member is disposed to engage the sandwich, during its forward movement along a predetermined path and in the vicinity of its leading area, so as to guide the same upwardly into a second path that is determined by the relation of said member to the conveyor and the said rolls. Actually the bent contour of the glass sheets in their longitudinal axis establishes the position of the member since there is really a combination of events occurring in which the path described by the leading area of the sandwich over the supported member, and according to the particular curvature thereof, is controlled by the progressively changing position of the similarly but reversely curved following area of the sandwich which following area is still moving forwardly and downwardly on the descending conveyor.

Once the sandwich has passed through the pressing rolls which, as herein set-forth, are arcuately movable about a common axis, it is received upon a second conveyor that is adapted to descend under the increasingly added weight of the sandwich and to then gradually swing upwardly so that the said sandwich can be discharged from the apparatus along a substantially horizontal path of movement.

The principal object of our invention therefore resides in an improved method of and apparatus for pressing laminated safety glass, said apparatus having entry and discharge vertically swingable conveying means, between the opposed ends of which suitable pressing rolls are arranged, and a substantially fixed member between the entry conveying means and said pressing rolls for causing a glass-plastic sandwich to enter a confined passage formed by said pressing rolls along a predetermined path of movement.

A second object of the invention resides in the provision of a method of and apparatus for pressing laminated safety glass wherein the glass-plastic sandwich is caused to move along a predetermined, continuously changing path toward and away from pressing rolls located therein, and wherein a substantially fixed member is adapted to be shifted to change the course of the said predetermined, continuously changing path of movement as said sandwich approaches the pressing rolls whereby the lamination of flat glass sheets or bent glass sheets of various curvatures can be easily and rapidly effected.

Another object of the invention resides in the provision, in a pressing apparatus of the character described, of entry and discharge vertically swingable conveying means between the opposed ends of which suitable pressing rolls are arranged with means for guiding a glass-plastic sandwich from the entry conveying means to the pressing rolls and in which the said pressing rolls are caused to then swing about a common substantially horizontally disposed axis to locate the sandwich passing therebetween in suitable position for subsequent deposition upon the said discharge conveying means.

Another object of the invention resides in the provision in a pressing apparatus of the character described, of a variable control means for governing the arcuately swinging movement of a pair of pressing rolls about a common horizontal axis, said control means being adapted to vary the swinging action of said pressing rolls according to the curvature of bent glass sheets passing therethrough from an entry conveying means to the discharge conveying means of the pressing apparatus.

Another object of the invention resides in the provision, in a pressing apparatus of the character described, of a pair of operatively driven pressing rolls adapted to be swung about a common substantially horizontally disposed axis and are each composed of a plurality of rollers which are so supported that they are enabled to rise and fall in unison in a plane normal to the said common axis while assuming individually a parallel relation of contact with the surfaces of a glass-plastic sandwich and while they are carried in swinging movements about the said common axis.

Another object of the invention, in a pressing apparatus of the character described, resides in the provision of a control means for the pressing rolls thereof whereby said pressing rolls will be arcuately swingable about a common, substantially horizontal axis and at a controlled rate of motion and simultaneously swingable bodily about a vertical axis in order that bent glass sheets of a conical curvature may be received from an entry conveying means of the apparatus, passed between said pressing rolls and then deposited upon a discharge conveying means in a substantially automatically controlled manner of operation.

A further object of the invention, in a pressing apparatus of the character above described, resides in the provision of a means for supporting a plurality of pressing rolls in axial parallelism, for operatively driving certain of said pressing rolls and resiliently maintaining substantially tangential contact while being bodily swung back and forth about a common axis as a glass-plastic sandwich is being and after the same has been passed therebetween.

A still further object of the invention, in a pressing apparatus of the character above described, resides in the provision of entry and discharge conveying means for a glass plastic sandwich between the inner opposed ends of which a plurality of pressing rolls are supported in axial parallelism and tangential contact, of a guiding means adapted to adjustment to guide bent glass sheets of various curvatures from the entry conveying means to said pressing rolls, of means for operatively driving each of the said conveying means and the pressing rolls at a generally common rate of speed, and of a variable control means for causing the pressing rolls to rotate about a common axis in timed relation to movement of the glass-plastic sandwich therebetween, said guiding means and said control means being adapted to be readily changed to accommodate the pressing apparatus generally for the pressing of flat glass sheets and/or bent glass sheets of cylindrical, complex, compound or conical curvature.

Other objects and advantages of the invention will become more apparent during the course of the following description when read in connection with the accompanying drawings.

In the drawings wherein like numerals are employed to designate like parts throughout the same:

FIG. 1 is a perspective of a pressing apparatus for laminated glass sheets, as constructed in accordance with the invention;

FIG. 2 is a diagrammatic illustration of the pressing operation as performed by apparatus of the present invention;

FIG. 3 is a second diagrammatic illustration of the pressing of conically bent glass sheets by the apparatus;

FIG. 4 is a perspective of typically composited bent glass sheets and plastic interlayer laminae;

FIG. 5 is a side elevation of the pressing apparatus;

FIG. 6 is a plan or top view of the pressing apparatus;

FIG. 7 is an elevational view of the apparatus at the entry end thereof;

FIG. 8 is an enlarged side elevational view of the central portion of the pressing apparatus;

FIG. 9 is a cross-sectional detail view as taken on line 9—9 of FIG. 8;

FIG. 10 is a fragmentary perspective view of the conveyor for supporting the glass-plastic sandwich;

FIG. 11 is a partial side elevational view of the takeoff end of the apparatus;

FIG. 12 is a transverse, horizontal sectional view taken on line 12—12 of FIG. 8, and showing the pressing roll assembly in a substantially vertical position;

FIG. 13 is a transverse, vertical sectional view taken on line 13—13 of FIG. 12; the pressing roll assembly being shown as in FIG. 12;

FIG. 15 is a view showing the details of the pairs of rollers of the pressing rolls assembly;

FIG. 16 is a vertical sectional view of the rollers and as taken on line 16—16 of FIG. 14;

FIG. 17 is a perspective of a cradle for supporting one pair of rollers;

FIG. 18 is a diagrammatic view of the individual disposition of the rollers when pressing a transversely curved glass-plastic sandwich;

FIG. 19 is a transverse, horizontal view taken substantially on line 19—19 of FIG. 14;

FIG. 20 is a vertical sectional detail view as taken substantially on line 20—20 of FIG. 12;

FIG. 21 is a top view of a conventional air-motor that is employed with the pressing apparatus;

FIG. 22 is a detail view showing the various parts of the apparatus arranged for the pressing of flat glass-plastic sandwiches;

FIG. 23 is a fragmentary detail view of one support for the pressing roll assembly;

FIG. 24 is a horizontal cross-sectional view as taken on line 24—24 of FIG. 23;

FIG. 25 is a detail view showing the various parts of the apparatus arranged for the pressing of conical glass-plastic sandwiches; and FIG. 26 is a diagrammatic illustration of a combined hydraulic and electric system for the pressing apparatus.

Figure 14:
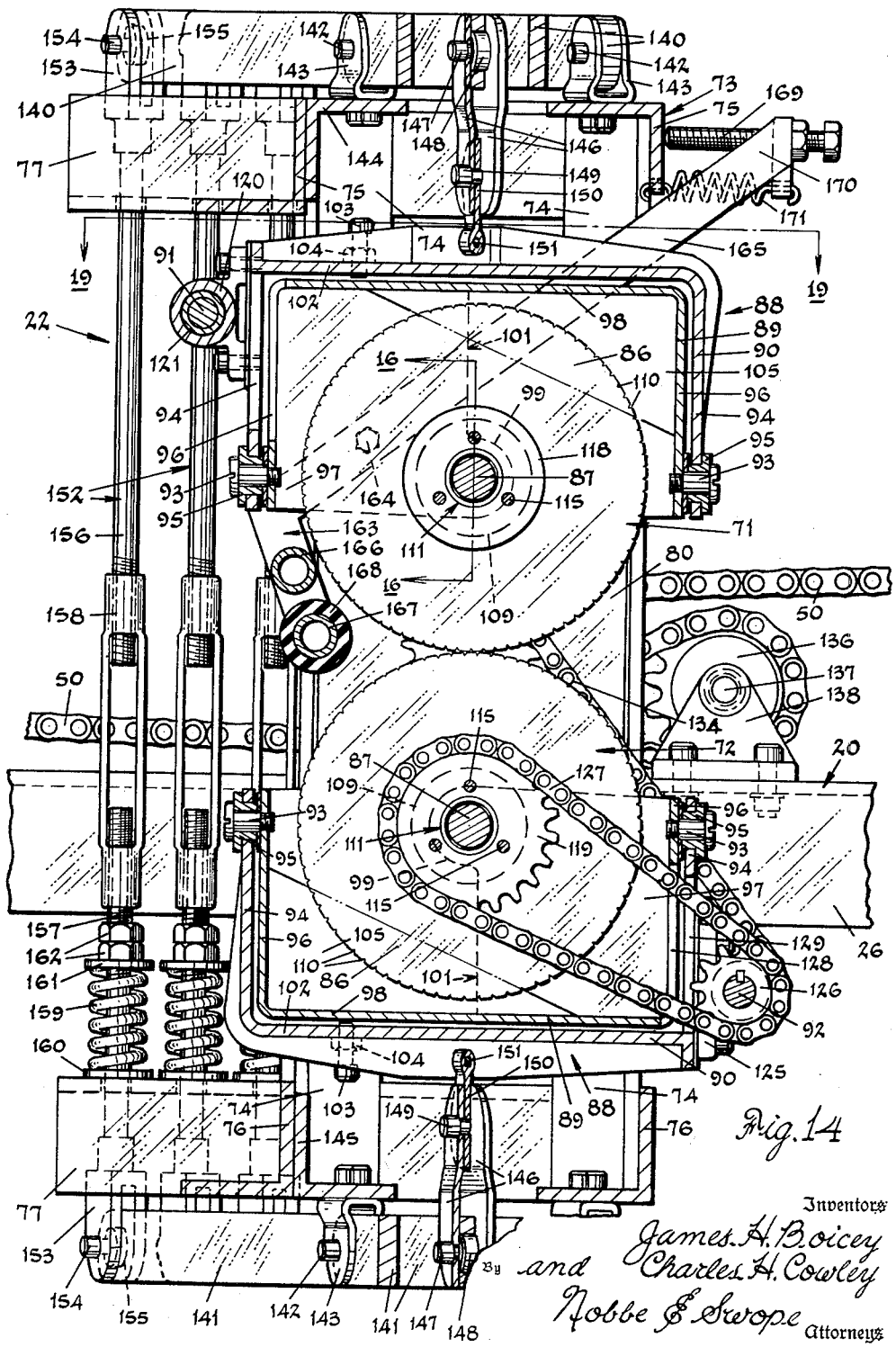
FIG. 14 is a longitudinal, vertical sectional view of the pressing roll assembly and as taken on line 14—14 of FIG. 12.

It has been customary in the prior art to provide at least one pair of axially parallel pressing rolls in a suitable production conveyor line for the purpose of imposing a preliminary pressure on a sandwich composed of glass sheets and a non-brittle thermoplastic interlayer to exhaust entrained air therefrom and bring about partial contact of the opposed surfaces. Usually, after a brief heating within an oven, the so-called sandwich is again subjected to pressure and, since the plastic is then in a softened, slightly adhesive condition, obtain a more thorough contacting of the surfaces and a sealing of the marginal edges to prevent entry of oil therebetween which is the cause of "blow-ins" or objectionable visual areas in the ultimate laminations. While effective in their purpose and adapted to conventional procedures, no apparatus is known that is designed to handle in a rapidly adjustable manner, immediately successive runs of varying patterns of flat or curved glass without considerable "down-time" for alterations and even the substitution of another form of modified apparatus.

In the course of constantly changing designs and purposes for which laminated safety glass is employed, it is therefore highly advantageous to equip a production line with an apparatus capable of substantially instantaneous "change-over" without any ensuing delay in the flow of glass-plastic sandwiches from the area of their assembly to the area at which they are placed in cans for final operations in an autoclave. To accomplish this purpose, we have provided an apparatus, such as is shown in FIG. 1, with a pair of endless conveyors that are pivotally supported at their outermost ends and connected with counterbalancing devices at their innermost ends. Between these conveyors, a pair of pressing rolls formed by a plurality of rollers are arranged in axially parallel, tangentially contacting relation.

In order that the glass-plastic sandwich can be guided from the first or entry conveyor to this pair of rolls, a rod is disposed in advance of said pair of rolls, and the general elevation of this rod is predeterminedly established to carry the sandwich in a path through which it will move from said conveyor to a confined passage formed by the pressing rolls. Since the entry conveyor is adapted to swing downwardly in an inward direction, the weight of the sandwich thus causes it to descend while carrying the sandwich forwardly until the leading area of the same engages and rides on the guiding rod. Now, the action of downward, forward movement in one or rearward area of the sandwich combined with the movement of a more forward area, as guided by the rod, creates a directing of the sandwich bodily so that the leading edge area will approach and enter between the pressing rolls along a plane that is generally tangential to each of the rolls.

As the rolls pass the sandwich therebetween, they are caused to arcuately swing about a common axis to revolve the sandwich through a vertical plane or arcuate path toward and onto the discharge or take-off conveyor which, as in the instance of the entry conveyor, is adapted to swing downwardly in a direction toward the pressing rolls. As the weight of the sandwich increases on this latter conveyor, it descends to comparably accept the swinging sandwich and then rises to assume a substantially horizontal position to discharge the sandwich onto a subsequent conveyor in a convenient manner. Briefly illustrated, the general principles of the invention may thus be comprehended upon examination of FIG. 2 wherein A indicates the entry conveyor, B indicates the guiding rod, C indicates the pressing roll assembly and D the take-off conveyor.

Assuming that the conveyor A is carrying a glass-plastic sandwich S forwardly, the weight thereof causes the conveyor A to descend generally to a position indicated at $a$. The leading area L of sandwich S is now moved into engagement with rod B so that the area L moves forwardly and upwardly while the following area F is still descending. As the leading area L passes into the confined passage between the rolls C, they, being driven, move the sandwich forwardly so that in balanced relation the following area F tends to allow the entry conveyor A to rse. In accordance with the invention, a control causes the rolls C to rotate about a common axis indicated at $c$ and swing the sandwich S in a vertical plane or arcuate path, and still with forward movement, toward and onto the take-off conveyor D which then descends from its normally horizontal position as the weight of the sandwich increases thereupon. From a lowermost position of descent, generally indicated at $d$, and as the sandwich is moved forwardly across the conveyor, the counter-balancing influence thereof allows the takeoff conveyor to gradually assume a more horizontal position in which the sandwich will be discharged.

One of the especially novel features of our invention resides in the fact that this swinging of the pressing rolls is of an adjustably controlled nature such that a definitely timed relation of motion can be established between the swinging movement of the rolls and the character of curvature of the sandwich being pressed. Once the sandwich is moved onto the take-off conveyor D, the pair of rolls are swung in a reverse direction to their original position in a manner to be more fully described hereinafter.

Should the degree of curvature to which the sheets are bent be changed or, in other words, if bent glass sheets of a differing curvature are to be pressed, the rod B is moved vertically, either upwardly or downwardly, so that the leading area L of the second form of curved sheet may approach the pressing rolls along a tangential plane similar to the approaching movement of the first form of sheet. And this curvature may be cylindrical; complex or U-shaped; compound or bent in both axes, or of a conical bend wherein the curvature of one of the longer sides of the sheet varies from the curvature of the opposite longer side of the sheet. Also by properly locating the entry conveyor A, the apparatus will be adapted to press flat glass-plastic sandwiches.

In the event that sandwiches of which the glass sheets are conically bent are to be pressed, the support E for the pressing rolls C at one end thereof is released from a fixed position so that said rolls are enabled to be swung back and forth in a horizontal plane, as in FIG. 3, while swinging about a common axis in a vertical plane or arcuate path and while operatively moving the sandwich therebetween. These briefly set-forth advantages of the present invention will be more fully described hereinafter in their sequential order of events.

Referring now to the drawings for a more detailed description, there is disclosed in FIG. 1 a pressing apparatus, constructed in accordance with the invention, and which generally comprises a main structural framework 20, the entry conveyor 21, the pressing roll assembly generally designated by the numeral 22 and the take-off conveyor 23.

The main structural framework 20 includes vertically disposed angular members 24 forming the end or corner members, centrally disposed vertical members 25 and horizontally disposed pairs of angular side members 26 and 27. Transversely between the vertical members 24 and 25, suitable brace members 28 may be secured to re-enforce the structure and provide supporting surfaces for operative elements of the apparatus.

The Entry Conveyor

The entry conveyor 21 has a frame 29 of a substantial L-shape with horizontally disposed angles arranged as side members 30 and end member 30′, vertical depending bar 31 and bracing members 32. The conveyor frame 29 is pivotally supported relative to the main framework 20 by means of a shaft 33, journaled adjacent its ends in bearings 34 mounted on the angular members 26 and which carries bearings 35 secured to the side members 30 of the frame 29. The shaft 33 is accordingly rotatably supported by bearings 34 on the frame 20 while the frame 29 is pivotally supported on shaft 33 by means of bearings 35. Inwardly of and adjacent to the bearings 35, a pair of sprockets 36 are mounted on and fixedly secured to the shaft 33. At the opposite and inner ends of side members 30, a shaft 37 carrying corresponding fixed sprockets 38 is journaled in bearings 39 (FIG. 8).

The pairs of sprockets 36 and 38 are longitudinally aligned and support suitable sprocket chains 40 forming the moving supports of an endless conveyor 41 comprised with chains 40 of transversely disposed bars 42. The bars 42 may be connected at regularly spaced intervals to certain links of the chains 40 in a conventional manner and are arranged throughout the continuity of the chains to provide a surface for supporting the glass-plastic sandwiches S. Preferably each bar 42 has a glass abrasion or scratch-free surface afforded, in a simple manner, by tubular rubber members or lengths of rubber hose 43 having a grooved annular periphery (FIG. 10). The resiliency of the rubber members 43 also permits them to flex through their length and thereby conform to not only the longitudinal curvature of the sandwich as imposed by its weight but as well to some extent conform to the transverse surface of the glass sheets whether such surface is substantially flat or somewhat curved. This flexing of the rubber members accordingly enables the glass by its weight to shape the surface of the conveyor 41 and support the sandwich against shifting during its forward movement thereupon.

The chains 40 are operatively driven from a motorized transmission unit 44, supported on a plate 45 on brace members 28 adjacent the entry end of the apparatus, by means of a sprocket drive having a chain 46 trained about a sprocket 47 on the motor shaft and a sprocket 48 secured on shaft 33. As will be more fully described hereinafter, the shaft 33, outwardly of a bearing 34 at one side of the framework 20, has secured thereon a sprocket 49 which constitutes the drive sprocket for the apparatus in its entirety by means of the endless sprocket chain 50.

Since the entry conveyor 21 is a substantially freely swingable element about the axis of shaft 33, it is adapted to be disposed in a horizontal position or to descend therefrom according to the disposition of weight that it is carrying. However, since its vertically swinging movements virtually form a component action of the movement of the sandwich thereon, means is provided to offset the actual weight of the conveyor 21 in its entirety thereby permitting the same to easily descend to or rise from any angular position to which it may descend under the weight of the sandwich. While similarly adaptable devices may be substituted without departure from the spirit of the invention, provision is herein made to counterbalance the conveyor's weight by means of an annular solid ballast 51 of comparable weight. The ballast is connected to the inner or free end of the frame 29 by means of a cable 52 attached to the end of side member 30 and trained about pulleys 53 rotatably carried in brackets 54 secured to a brace member 28 at the top of the centrally disposed vertical angles 25 (FIG. 6). The cable 52 may thus be directed upwardly, paralleling one angle 25, over one pulley 53 to the second pulley on the opposite side of the framework 20 and then downwardly to its connection to the ballast 51. If desired, an annular sleeve 55 (FIG. 12) may be secured on the framework 20 to guide said ballast and prevent the undesired swinging thereof. Also to restrain the conveyor 21 from rising beyond a substantially horizontal position, a limiting stop, in the form of an adjustable set-screw 56, is carried by a bracket 57 secured to an adjacent side angle 26 and may be positioned to engage one of the horizontal side members 30 of conveyor frame 29.

Means is provided for stopping the downwardly swinging descent of the entry conveyor 21 to locate the inner end thereof at predetermined positions of elevation at which certain types of glass-plastic sandwiches are to enter the pressing roll assembly 22. Such a means may include a slide member 58 that is formed, as shown in FIGS. 8 and 12, to conform to and substantially interfit with one leg of a vertically disposed angle 25 and has a depending bar 59 at its lower end. The bar 59 is provided at its lower extremity with an inwardly directed flange 60 which is adapted to engage the adjacent frame member 30. The slide 58 is equipped with a handled setscrew 61 by which it can be releasably secured to the angle 25 at any desired position of elevation.

The flange 60 is intended to engage the adjacent side member 30 of frame 29 and thus limit the movement of said frame and the conveyor 41 carried thereon. At one particular position, the flange will stop and support the entry conveyor 21 when the upper flight of the conveyor 41 is substantially horizontally aligned with the horizontally disposed transverse axis of the pressing roll assembly 22 for supporting flat glass-plastic sandwiches and directing them into said assembly.

The Take-Off Conveyor

The take-off conveyor 23 is constructed to function in the same manner as the entry conveyor 21 and its component parts are identified by the numerals employed in connection with the conveyor 21. The take-off conveyor 23 accordingly has a frame 29 that is pivotally supported on its associated shaft 33 by means of bearings 35 secured to the side members 30. The shaft 33, journaled in pillow bearings 34 on side frame members 26, is located at the rear end of the main framework 20.

In actual use, the pressing apparatus is located in an area closely adjoining an air-conditioned room wherein the glass sheets and plastic interlayers are assembled. In one form of such assembly, these component parts of laminated safety glass would appear as is illustrated in FIG. 4 wherein a sheet of plastic interlayer 62 is shown suitably interfitting with a lower glass sheet 63 and an upper glass sheet 64. The upper and lower glass sheets, by way of example and as herein shown, have previously been optically matched, pattern-cut and simultaneously bent according to the required curved contour of a typical one-piece windshield for an automobile. This particular curvature includes a wide central area of shallow curvature, which rises through an arc of smaller radius, and ends outwardly in areas of again larger radius or even slightly flattened areas. A bent glass-plastic sandwich of this character will be described in connection with the form of exemplary apparatus, herein disclosed; it being understood, however, that half-windshields or curvatures representative of either the right or left hand windshield portions can as easily be pressed.

The essential characteristics of each curvature or bent contour and the size or weight of the sandwich having been predetermined, the so-called guiding rod or support B may be properly positioned with reference to the entry conveyor and to the pressing rolls. In other words, the weight of the sandwich naturally will vary the extent of angular descent of the entry conveyor 21 and the character of bend in the leading area will determine the most advantageous position in which the sandwich must engage and be supported by the guiding support during its movement toward the pressing roll assembly 22.

The glass sheets, after being carefully washed and inspected, are placed on an endless conveyor in the assembly room; matched with the thermoplastic interlayer 62, and conveyed out of the room to a point at which the entry conveyor 21 of the pressing apparatus may receive them. As well, after passing from the first pressing apparatus and through a heating oven (according to one form of preliminary pressing), the glass-plastic sandwich S will be received on the entry conveyor 21 of a second pressing apparatus wherein, as previously described, said sandwich is again subjected to pressure. For production purposes, pressing apparatus of the character herein described may therefore be effectively employed either to press the sandwich in the first or second phases of this preliminary forming step in the laminating operation.

Accordingly, when a glass-plastic sandwich is moved onto the entry conveyor 21, it is received on the supporting surface afforded by the tubular rubber members 43 and is carried forwardly by the action of the driven sprockets 36, 38 and chains 40. As the weight of the sandwich is imposed on the conveyor inwardly of the shaft 33, it overcomes the influence of the ballast 51 and the conveyor is swung downwardly and substantially inwardly until the leading area L of the sandwich S engages and is supported by a guide member 65.

For purposes of illustration, this member may be formed by a rod 66 having a resilient outer surface 67 of rubber or like material. The guide member 65 is rotatably supported at the ends of rod 66 in slots or notches 68 of vertically disposed bars 69 secured to angles 26 and 27. Preferably the rod 66 has enlarged ends 70 for convenience of handling and to prevent accidental transverse sliding of the rod within the notches 68. These notches are arranged in angular relation in each of the bars 69 and are open at the edge thereof directed toward the conveyor 21. While herein shown in regular vertically spaced order with respect to one another, it is not intended to preclude the possibility of only employing and therefore only forming sufficient and irregularly spaced notches that are arranged vertically according to desired positions of the guide member 65 for the various curvatures to which glass sheets may be bent. The notches 68, however, of one bar 69 are arranged in horizontal alignment with those of the transversely opposite bar 69 and, if desired, for rapid placement of the member 65, corresponding notches may be suitably identified by legends which will indicate, from either side of the apparatus, the correctly aligned pairs of notches.

The guide member 65 is therefore located, according to the particular curvature to which the leading area of the glass sheets have been bent and the angular position to which the entry conveyor has been swung downwardly by the weight of the glass-plastic sandwich, to support and direct the sandwich during its forward movement along a predetermined path and thereover into a second path or upwardly inclined plane toward the pressing roll assembly 22. More especially, this upward inclination is to guide the leading curved area of the sandwich along a plane which is tangential to both of the cylindrical surfaces of the pair of rolls, generally indicated by the numerals 71 and 72, in said pressing roll assembly 22. Otherwise stated, the sandwich is directed into and supported in the assembly 22 so that at all times, while in the said confined path, it will be subjected to pressure in directions which are normal or perpendicular to the surface then contacted by the rolls of said assembly.

*The Pressing Roll Assembly*

This assembly comprises a supporting frame or cage 73 which resembles a parallelepiped in which the corners are formed by substantially vertically disposed angles 74, connected at their upper ends by a pair of transversely disposed angles 75 and at their lower ends by a pair of angles 76, said angles 75 and 76 forming the side elements of the cage. The ends of the cage are formed by pairs of angles 77 and 78 and, for purposes to be more clearly described hereinafter, the angles 77 located along one end of the cage 73 project outwardly beyond the side thereof while the angles 78, located along the opposite end of the cage, project outwardly from general formation of the cage in the opposite direction from the angles 77 (FIG. 12). Within and by this cage 73, the pair of rolls 71 and 72 are supported for rotation in unison about a substantially horizontally disposed common axis.

For this purpose, the cage 73 is equipped with plates 79 and 80 that are bolted to the oppositely disposed pairs of corner angles 74 and have integrally formed, aligned stub-shafts 81 and 82, respectively extending outwardly therefrom. The stub-shafts 81 and 82, of tubular cross-section, are adapted to support the cage 73 bodily on the framework 20 and are journaled in a roller bearing 83 and a pillow block 84 respectively that are mounted on the horizontally disposed side angles 26 of said framework. The axes of the stub-shafts are aligned with each other in a plane which generally extends through the points of tangency or contact of the rolls 71 and 72. The roller bearing 83 is normally restrained from movement by means of a crank assembly generally designated by the numeral 85 and which will be more fully hereinafter described.

The rolls 71 and 72 are each composed of rollers 86 that are supported in individual pairs and in such a manner that opposed pairs of rollers of the rolls 71 and 72 will be constantly urged into surface contact. This contact is maintained substantially constant so that the actual pressure of the pairs of rollers, during passage of a sandwich therebetween, will be created by their resilient resistance to distortion while the desired amount of pressure is being exerted on the sandwich. The aligned pairs of rollers of each roll 71 and 72 are also adapted by their manner of support within the cage 73 to move in unison in substantially vertical directions to follow and conform to the bent curvature of the sandwich should the same be bent in both of its axes. Further, the pairs of rollers 86 are carried within their support so that they will swing in a vertical transverse plane so that their axes will assume individual, substantially parallel relations with the surfaces of the glass sheets. Thus, when the glass sheets of a sandwich are bent transversely, the opposed pairs of rollers 86 will be displaced from planes parallel to the axes of the stub-shafts 81 and 82 and simultaneously may swing out of alignment with the adjacent pairs of rollers of the rolls 71 and 72. And the pairs of rollers 86 of the roll 72 are driven to provide traction for the sandwich as it is passed between the rolls 71 and 72.

For these purposes, each pair of rollers 86 is individually mounted by an axle 87 in a stirrup member 88. Broadly speaking, the stirrup members provide universal supports for the pairs of rollers, comprising either of the rolls 71 and 72, in that the stirrups are bodily supported to enable said rollers to move in planes substantially perpendicular to the surfaces of the glass sheets and to simultaneously, if necessary, move angularly so that their supporting axle will become located in parallel with the glass surfaces. To accomplish this novel type of support for the rollers 86, the stirrups 88, upon reference to FIG. 14, will be seen to be of a two-part construction of which an inner cradle 89, carrying the associated axle 87, is pivotally mounted in an outer yoke 90. The yokes 90 of roll 71 are, generally speaking, pivotally supported in the cage 73 by means of a rod 91 while the yokes 90 of roll 72 are similarly mounted on a shaft 92. Since the stirrups 88 are all of the same form, it is believed that a description of one will suffice for all. Thus, the cradle 89 and yoke 90 of each stirrup are of a similar and interfitting U-shape formation and are pivotally interconnected by shoulder screws 93.

More particularly, the extremities of the legs 94 of yokes 90 are provided with sleeve bearings 95 in which the screws 93 are journaled and the ends of said screws are threaded into the ends of legs 96 of the cradle 89. As may be best seen in FIGS. 14, 15 and 16, each cradle supports an axle 87 transversely to and substantially in the plane of the aligned axes of the shoulder screws 93 and for this purpose is formed to provide partial side walls 97 which enclose the cradle between one of the legs 96 and the web 98 thereof. At the lower outer corner of each wall 97, a circular area 99 is formed which is apertured to receive bolts 100 that are threaded into the opposed ends of axle 87. Preferably the circular areas 99 are recessed inwardly from the major plane of the side walls 97 and the vertical edges thereof are off-set from the axial line of circular areas 99. The recessing of the areas 99 and the off-set vertical edges 101 of the walls 97, as shown in FIGS. 13 and 19, permit the alternate positioning of the cradles 89 within their individual stirrups 88 for close positioning of the stirrups with respect to one another.

This allows an equal spacing between the successive pairs of rollers 86 to the end that pressure exerted on the glass-plastic sandwich will be equally distributed. This spacing of the pairs of rollers 86 also creates a plurality of individual areas of pressure that are adapted, by reason of their support as well as the resiliency of rubber surfaces, to absorb and follow slight irregularities which may exist transversely across the sandwich.

At the same time, the stirrups 88 are adapted to individually swing about the axis of the rod 91 or the shaft 92 while the associated cradles 89 may swing about the axes of the screws 93 without interfering with the similar swinging movement of a closely adjacent cradle 89. If desired to limit the angular movement of the cradles 89 on the axes of screws 93, the webs 102 of yokes 90 may be provided with suitable set-screws 103, equipped with lock nuts 104 (FIGS. 14 and 19), said screws being adapted to engage the web 98 of associated cradle 89.

Obviously, when the stirrups and the contained cradles are moving to conform to a transverse curvature of a sandwich, each will move vertically and angularly to approximate the characteristic of the glass surface then in contact with the rollers 86. The relative movement of the stirrups 88 is diagrammatically illustrated in FIG.

18 wherein it will be noted that the rollers 86 are carried upwardly by their related stirrups from the common axial lines indicated by the numerals 71a and 72a to agree with the imposed elevation of the glass curvature while the cradles 89 are swung on the screws 93 until the axles 87 carrying the rollers are substantially parallel with the surfaces of the glass sheets.

If desired to re-enforce the cradle 89 and especially the leg 96 not associated with the side walls 97, a gusset plate 105 may be employed and secured between said leg and the web 98 of the cradle. Also ribs 106 may be provided on the outer surface of the web to strengthen the same throughout its longitudinal span.

As shown in FIG. 16, each of the rollers 86 has an outer peripheral surface formed by a rubber tire or collar 107 that is vulcanized to a metal annular core 108 and 109 of rollers 86. The rubber selected for these tires is preferably of a hardness that will slightly distort under pressure while still exerting a suitable amount of contact pressure on the sandwich. For example, rubber compositions having a durometer range of between 35 and 65, have been found quite satisfactory. The surface of each tire 107 is preferably provided with transversely disposed grooves 110 to improve traction or the contact between said roller and the glass surfaces. One end face of each core, 108 or 109, is formed with a shoulder 111 which shoulders are disposed in abutting relation. Likewise, in their opposite or outer faces, the cores are similarly formed with an internal annular recess 112 to receive a ball bearing 113, the inner race of which is mounted on an axle 87 located in axial bores 114 that are slightly larger in diameter than said axle.

The cores 108 and 109 of each pair of rollers 86 are adapted to be firmly secured together by means of bolts 115, FIG. 16; one core, such as the core 108, being provided with tapped holes 116 for receiving the threaded ends of bolts 115 while the opposite core (109) is provided with counter-bores 117 to receive the heads of the bolts.

In assembling the pairs of rollers, in the case of the roll 71, a spacing washer 118 is placed on the respective and matching shoulders 111 of the associated cores 108 and 109, the washer having suitable openings for passing the bolts 115 therethrough. In the instance of the roll 72, a sprocket 119 is located on the abutting shoulders 111 of the associated cores 108 and 109. In either event, the rollers 86 are mounted for free rotation on the bearings 113 by the associated axle 87 which is mounted at its ends in the walls 97 of a cradle 89 by the machine screws 100.

Referring again to the yokes 90 of roll 71 and their mounting on rod 91, each yoke has affixed to the outer surface of the adjacent leg 94 a bracket 120 containing a sleeve bearing 121. The yoke 90 is accordingly freely pivotal on the rod 91 and, if desired, locking collars 122 (FIG. 19) may be secured to said rod at opposite ends of each bearing to restrain the said yoke from displacement. The rod 91 is fixedly carried at its opposite ends in brackets 123 secured to the vertical angles 74 of the cage 73.

In the case of the yokes 90 of roll 72 on shaft 92, provision is made for supporting said shaft at its ends in pillow bearings 124 secured to the oppositely disposed angles 74. The shaft 92 is thus adapted to be rotated to drive the rollers 86 of roll 72 while at the same time support said rollers generally by their stirrups 88. For this purpose, the adjacent leg 94 of the yokes 90 has secured thereto pillow bearings 125 for the shaft 92 and between which there is keyed on shaft 92 a sprocket 126. The sprockets 119 associated with the rollers 86 of roll 72 are each operatively connected to a related sprocket 126 by a sprocket chain 127 so that they will simultaneously rotate the pairs of rollers 86 as the shaft 92 is driven. Preferably the adjacent leg 94 of yokes 90 and leg 96 of cradles 89 are apertured as at 128 and 129, respectively, for passage of the chain 127 therethrough (FIG. 14).

At one end of the sheet 92, a sprocket 130 is fixedly mounted. The sprocket 130 is driven from the transmission unit 44 through the chain 50 in timed relation to the movement of the chains 40 of the entry conveyor 21. For this purpose, the supporting stub shaft 82 of the cage 73, as previously described, tubular of cross-section, is equipped with bearings 131 in its opposite ends for supporting a shaft 132. The shaft 132, inwardly of the plate 80 from which the shaft 82 integrally extends, carries a sprocket 133 that is operatively connected to sprocket 130 by a sprocket chain 134, and outwardly of the pillow block 74, a second sprocket 135 (FIG. 13) about which the link chain 50 is trained. Preferably to maintain a general similarity in direction of rotation of the conveyor 41 in entry conveyor 21, the pressing roll assembly 22 and the conveyor of take-off conveyor 23, the chain 50 (FIG. 1) is trained about an idler sprocket 136 rotatably carried by a shoulder bolt 137 fixedly secured in plate 138 attached to the adjacent angle 26. The chain 50 thus is driven by sprocket 49 on shaft 33; is trained about sprocket 135, is directed forwardly (of the framework 20) about the sprocket 136 and then rearwardly to a sprocket 139 associated with and generally driving the shaft 33 of the takeoff conveyor 23.

Accordingly, each and all of the pairs of rollers 86 of roll 72 will be operatively driven from the sprocket 135 by shaft 132, sprocket 133 and chain 134 to the sprockets 126 and 130 on shaft 92 and by chains 127 to the individual sprockets 119. Also each pair of rollers 86 of roll 72 are adapted to pivot or swing arcuately in a substantially universal manner about the axis of the shaft 92 as well as in the axees of the screws 93. Likewise, each of the pairs of rollers of roll 71 are adapted to swing arcuately and independently of adjacent pairs of rollers about the axis of the rod 91 and the axes of their related screws 93 whereby, as shown diagrammatically in FIG. 18, the opposed pairs of rollers 86 will be adapted to mutually follow the curved surface of the glass sheets while cooperating to exert suitable pressure thereagainst.

The conveyor belts forming the moving support of conveyors 21 and 23 and the pressing roll assembly 22 of the pressing apparatus are preferably so inter-related in their operation that a substantially constant rate of movement of the glass-plastic sandwich through the apparatus will be effected. As previously mentioned, the endless conveyor 41 of conveyor 21 and the similar endless conveyor 41 of conveyor 23 and the rolls 71 and 72 of the pressing assembly 22 are driven in common by the sprocket chain 50 and the sprockets 49, 135 and 139 and the sprockets 119, 126 and 130 are so proportioned in diameter that the rolls 71 and 72 will revolve with a surface speed comparable to the speed of movement of the associated conveyor belts. This assures that the sandwich will be received between, passed through and discharged from the rolls 71 and 72 at the same speed of movement at which it is carried by the conveyor belts of the conveyors 21 and 23. Also the timing control for swinging the cage 73 boldly may be adjusted so that the rolls will preferably be swung or rocked from the position for receiving a sandwich to the position for discharging the same while the central area of the sandwich is passing therebetween. As will be more fully described hereinafter, the cage 73 is adapted to be swung in a definitely timed interval to the movement of the sandwich so that said sandwich is neither lifted from the conveyor 21 nor deposited on the conveyor 23 while only an extreme end area of the sandwich is engaged and passing between the rolls. In consequences, the progressive, forward movement of the sandwich is constant and there will be no sudden increase of motion or lifting of the sandwich when its major portion or the weight thereof is substantially unsupported.

As best seen in FIG. 14, the cage 73 is located in a substantially vertical position for simplicity of delineation although its normal rest position would be as shown in FIG. 8. Thus it will be seen that the rollers of the rolls 71 and 72 are normally in rolling contact with one another but are permitted pivotal movement about the axes of their supports, namely, the rod 91 and shaft 92, which pivotal movement will be substantially in unison as when a glass-plastic sandwich passes therebetween and according to the transverse curvature of the sandwich as distinguished from the longitudinal curvature therein. The pairs of rollers, however, are preferably arranged to co-operate in this vertically aligned relation to exert the desired amount of pressure continuously at both surfaces of the sandwich.

More particularly, each oppositely related pair of rollers 86 are interconnected by means of a pair of bars so that their movements will produce following movements of the pairs of bars. This interconnection approximates in rough outline the form of a parallelogram and it is believed that the suggested similarity will simplify the description thereof. As best seen in FIGS. 12 and 14, the bars are arranged above the top and beneath the bottom of the cage 73. Briefly, they are pivotally carried by the cage at one end and are linked together at their opposite end. Between their support and their manner of connection, the bars are linked to the stirrups 88 in such a manner that, as for example, when an upper pair of rollers 86 are displaced upwardly, the associated bar 140, forming one side of the so-called parallelogram, will cause the opposite bar 141 to move in parallelism therewith and carry the oppositely related pair of rollers upwardly in an agreement of motion. Also by means of the bars, the pressure afforded by the pairs of rollers can be adjustably maintained.

For this purpose, a plurality of levers or bars 140 are located adjacent to, and generally parallel to the plane of the top of the cage 73 while a similar plurality of bars 141 are disposed adjacently to the bottom of the cage. The bars are arranged to extend diagonally with respect to the side angles 75 and 76 of the cage and so that one, such as a bar 140, will be disposed above and one, a bar 141, beneath each of the aligned pairs of rollers 86 and so as to pass through a medial vertical line at the tangency of the rolls 71 and 72. This general positioning of the bars locates them substantially centrally between the individual pairs of rollers. The bars 140 and 141 are pivotally mounted on bolts 142 carried in brackets 143 secured to an auxilary angle 144 and an opposite upper angle 75 and to an auxiliary angle 145 and an opposite lower angle 76 of the cage 73 (FIG. 14). A pair of straps 146 is connected to each bar 140 or 141 by bolt 147 and in order that the coaction between the straps 146 and either of the bars 140 or 141 will be substantially free from binding, the interconnecting bolt 147 is rotatably supported in a bearing 148 carried in the respective bar. The straps 146 are connected by a bolt 149 to a link 150 hingedly connected by pin 151 to the yoke 90 of a stirrup 88.

Preferably the bars 140 and 141 are so arranged that those associated with the pairs of rollers on one side of the longitudinal axis of the cage 73 (in relation to the framework 20) will extend outwardly on one side of the cage and those bars associated with pairs of rollers on the other side of the longitudinal axis will extend outwardly in the opposite direction (FIG. 12). The upper and lower bars 140 and 141, respectively, associated with any one of the vertically disposed pairs of rollers 86 may thus be connected together so that the movement of one pair of rollers will be transmitted to the opposite, associated pair to obtain a unison of pivotal movement and consequently maintain a constancy of pressure against the glass-plastic sandwich.

As herein shown in FIG. 14, the outer ends of each pair of upper bars 140 and lower bars 141 are interconnected by the tie-rod which is generally designated 152. The tie-rod is connected at its respective ends to said bars by means of yoke connectors 153, the bifurcated ends of which carry a bolt 154 rotatably supported by a bearing 155 in the ends of the bars. In order that the distance between the bars 140 and 141 can be altered to adjust the pressure of the rollers at their areas of contact, each tie-rod 152 may be formed by two rods 156 and 157 which have oppositely threaded (right and left hand), opposed ends joined by a turn-buckle 158. Obviously, when the turn-buckle is rotated, the distance between the ends of bars 140 and 141 will be increased or diminished. Such adjustment will operate to modify the force or pressure enforced upon glass-plastic sandwich by the pairs of rollers 86, of the rolls 71 and 72 generally. The rods 152 associated with each pair of bars also are adapted to act as stabilizers to support the roll assemblages in a general relation of alignment wherein the pairs of rollers of each roll combine to present a substantially common surface from which the said pairs, as previously hereinbefore set forth, may be temporarily displaced and again returned.

For this purpose, each threaded rod 157 extends through a coil spring 159, one end of which bears with a washer 160 against the upper surface of lower angle 77 or 78. The free and opposite end of said spring is adjustably limited by a washer 161 and lock-nuts 162 on rod 157 in a well-known manner whereby the expansible energy thereof may be controlled. The springs 159 are adapted to individually maintain a desired and normal position of operation for the rolls 71 and 72 through the bars 140 and 141 and tie-rods 152. And, since the supporting elements (the stirrups 88) for the rolls are capable of substantially free swinging movement about their supports, the rod 91 and shaft 92, each spring 159 is so located that its expansible influence can be exerted upwardly through the associated tie-rod 152 to thereby urge the bar 141 to carry the weight of the rollers 86 of the lower roll 72 and sustain the said rollers against the weight of the opposed rollers of the upper roll 71 which are, by their individual weight, capable of swinging downwardly about the axis of the rod 91.

To establish a satisfactory degree of working pressure between and throughout the opposed pairs of rollers 86, each rod 152 may be lengthened or shortened by means of the associated turn-buckle 158 to modify the pressure of contact between the opposed pairs of rollers. Then the expansible effect of the springs 159, may be adjusted by turning of the lock nuts 162 and acting particularly through the lower bars 141, raise the stirrups 88 of roll 72 until the peripheries of the related rollers of rolls 71 and 72 are in a plane aligned with the axes of stub-shafts 81 and 82 on which the cage 73 bodily is swingable.

As the glass-plastic sandwich S enters, at its leading area, between the rollers of rolls 71 and 72, it is pressingly gripped and is moved therebetween by the tractive force of the driven rollers of the roll 72. The cage 73 is now swung from the full line position of FIG. 8 to an oppositely angled position from which the sandwich is discharged onto the take-off conveyor 23 as is shown in FIG. 11. The timing of this swinging motion is predetermined according to the character of the bend and the length of the sandwich being pressed and is calculated to start rapidly when the leading area of the sandwich has been passed between and slightly beyond the pressing area of the rolls.

In order to carry out this purpose, the rolls 71 and 72 are oriented in the most advantageous angular plane that will agree with the plane of the leading area of a sandwich. Accordingly when the angularly upward direction of movement of the sandwich from the guide rod 65 has been determined, the cage 73 and rolls 71 and 72 therein are bodily adjusted in their angular position until it is found that the leading area of the sandwich will enter between said rolls along a plane substantially tangential to both rolls. The pressure exerted by the rolls will therefore at all times be in plane substantially normal to the glass surfaces.

As herein provided, motion of the cage 73 is initiated by the rolling contact of the sandwich or the upper sheet 64 thereof against and with a pivoted frame generally designated by the numeral 163. This frame is carried by bolts 164 which are secured in the plates 79 and 80 of cage 73. More particularly, the frame includes substantially L-shaped end members 165 that are interconnected by a fixed rod 166. The frame carries a rotatably mounted shaft 167 which is equipped with an annular rubber covering 168 which shaft is positioned (FIG. 14) so as to be engaged by the leading area of the glass-plastic sandwich after it has passed through the area of pressure. The shaft 167 is positioned slightly below the plane of movement of the sandwich so as to be urged or swung upwardly as the edge of the sandwich moves thereagainst. This position of the shaft may be adjusted by means of a set-screw 169 carried in a bracket 170 formed on an extension of one of the end members 165. The screw 169 normally is held in abutting relation with a side angle 75 of the cage 73 by means of a tension spring 171, the spring also operating to return the frame 163 in its entirety to its rest position when the sandwich has moved from engagement therewith.

The frame 163, when swung or moved upwardly, produces closure of a micro-limit switch 172 which operates as a starter element of a control system by means of which the swinging movement of the cage 73 is carried out. As herein disclosed in FIG. 20, the normally open micro-switch 172 is mounted by means of a bracket 173 on one of the corner angles 74 of cage 73. The switch 172, upon reference to the diagrammatic showing in FIG. 26, will be seen to complete the energizing circuits for the solenoids of two relay switches. For this purpose, the switch is connected by supply line 174 and manual switch 175 to one side 176 of an electrical source and by lines 177 and 178 to the solenoids 179 and 180 of relay switches 181 and 182 respectively.

The circuit of solenoid 179, when it is to be energized, is completed by line 183 to the opposite side 184 of the electrical source and thus closes a circuit from supply line 174, through bar 185 and contacts 186 of relay switch 181 and by line 187 to one side of an electrically operated four-way valve 188 and thence by lines 189 and 183 to the source 184. The line 178, from line 177 and switch 172, completes the circuit of solenoid 180 of relay switch 182 by lines 190 and 183 to source 184. The solenoid 180, when energized, closes a circuit through bar 191 and contacts 192 of relay switch 182 to complete a circuit between lines 193 from supply line 174, and line 194 to one side of a normally open micro-switch 195. The relay switch 182, as herein shown for purposes of illustration, may be operated by solenoid 180 in one direction or by a second opposed solenoid 196 in the opposite direction. Thus when the bar 191 is carried into engagement with contacts 192, it is simultaneously separated from contacts 197. However, upon energization of solenoid 196, as will be subsequently described, bar 191 will be moved from contacts 192 to resume engagement with contacts 197.

The four-way valve 188 is the control element of a conventional air-motor, designated in its entirety by the numeral 198 and shown in FIG. 21. The air-motor, briefly set forth, includes a pressure cylinder 199, a stabilizing cylinder 200 and a balancing cylinder 201. This construction, which per se forms no part of the present invention, is intended to operate in accordance with known hydraulic principles by which activity within the pressure cylinder 199 will be controlled by the cylinder 200 and a balance will be maintained between the ends of cylinder 200 by its connection to cylinder or reservoir 201. A piston rod 202 is slidably supported in suitable glands in the end cap 203 of cylinder 199 and within said cylinder has fixedly mounted thereon a piston 204. The rod then extends rearwardly through glands in a header 205, closing the opposite end of cylinder 199, and into cylinder 200 and therein at its end carries a piston 206. Obviously, if the cylinder 200 is supplied by a closed hydraulic system, the piston 206, mounted in tandem with the piston 204 on rod 202, is adapted to control the movement of the rod when pressure is applied at one end or the other of cylinder 199.

The valve 188 is connected by conduit 207 through header 205 to the inner end of the cylinder 199 and by conduit 208 to the outer end of the same through the end cap 203. The valve may also be connected to a source of fluid, such as air, under pressure by pipe 208'. The cylinder 200, however, as part of a substantially closed hydraulic system, has a conduit 209 communicating from one end of the cylinder at header 205 to the opposite end at cap 210. The balancing cylinder 201 may be connected into conduit 209 by branch 211 to compensate for pressure variables in the system.

An auxiliary conduit 212 connected into conduit 209 operates to divert a portion of the fluid flowing therethrough or, in other words, flow of fluid between the ends of cylinder 200 may be said to be equally through conduits 209 and 212. If desired, suitable needle valves 213 may be located in each of the conduits. The conduit 212 contains a solenoid operable valve 214 which is adapted to restrictingly control flow of fluid through conduit 212 and thereby increase or reduce the rate at which the fluid is displaced between the ends of cylinder 200. The valve 214 is connected by line 215 to the opposite side of the normally open microswitch 195.

The air-motor 198 is adapted to cause the swinging or rocking movement of the cage 73 and, for this purpose, is mounted on a plate or channel 216 (FIG. 1) which is pivotally supported in a bracket 217 mounted on a side member 27 of main framework 20. The rod 202 of the motor is equipped at its outer end with a clevis 218 by which it is connected to a lever 219. This lever is keyed to the end of a rock-shaft 220 journaled in pillow bearings 221 on side members 27 (FIGS. 8, 9 and 12). The rock-shaft, upon rotation, produces the rocking motion of the cage 73 and simultaneously actuates controls for varying the rate of this rocking motion according to the area of the glass-plastic sandwich passing between the rolls 71 and 72. Preferably motion of the cage 73 is intended to proceed substantially rapidly while an upwardly-rising end area of the sandwich is entering between the rolls; to then be slowed down during movement of the more shallow central area between the rolls and then to finish rapidly as the following end area enters and leaves the pressing area.

The operative relation between the air-motor 198, the cage 73 and solenoid valve 214, will now become apparent. While a constant pressure is directed to the cylinder 199 to move the rod 202 by the piston 204, the effectiveness of this pressure will be governed by the ability of the fluid in cylinder 200 and conduits 209 and 212 to displace itself. And the resistance to normal movement of the piston rod 202 may be interposed by the partial or complete blocking of the conduit 212 at the valve 214. The slow and accelerated rocking motion of the cage 73 will therefore be determined by the intervals during which the valve 214 is open or closed.

Returning again to the rock-shaft 220, there is a sprocket 222 keyed thereon which is coupled to a sprocket 223 keyed onto the stub-shaft 82 of cage 73 by a chain 224 trained thereabout. In order that both flights of the chain between the sprockets will be maintained relatively taut, a tensioning means is provided and this includes an idler gear 225, carried on a shaft 226 journaled in link 227. The link 227 is pivotally suspended by an arm 228 carried on bolt 229 fixed in the side frame members 26 (FIG. 11). The link comprises a bar 230, a rod 231 threaded therein and having a looped end 232, a rod 233 having a looped end 234 and a spring 235 interjoining the loops 232 and 234. The link 227 generally is supported on the frame member 26 by a hooked end of the rod 233 which is carried in a suitable opening 236 in said frame member. For ease of adjustment, the rod 233 may be formed of two oppositely threaded rods 237 and 238 which are joined at their opposed ends by a turnbuckle 239. While described in the singular, it will be seen in FIG. 11 that both flights of the sprocket chain 224 are provided with such tensioning means.

Fixedly carried on a shaft 240 are two levers 241 and 242 (FIG. 9). The shaft is journaled in bearings 243 supported by plates 244 on vertical frame members 25. The lever 241 is adapted to be fixedly mounted on the shaft and in operative association with the micro-switch 195 that is supported on an angle 28. The lever 242 is relatively secured to the shaft 240 by means of a set-screw 245 to be moved therealong in operative association with any selected one of a plurality of cam plates 246 fixedly mounted on the shaft 220. Although two such plates are illustrated in FIG. 9, it is not intended to preclude the possibility of mounting as many cam plates as may be desired to achieve a rapid alteration in the operation of the apparatus since each cam will be related to a different timing cycle dependent upon the curvature of the glass-plastic sandwich to be bent.

The lever 242 in its outer bifurcated end carries a roller 247 which traverses the peripheral edge of the selected cam plate 246. As herein shown by way of example, the edge of the cam plate has a raised area 248 having a predetermined circumferential expanse proportionate to the desired interval during which the cage 73 is rocked at a slower rate of movement. The roller 247 therefore will initially traverse a peripheral edge of the cam described by a radius of lesser dimension than the raised area 248. The roller 247 will then ride onto said raised area and in so doing cause the lever 242 to rock the shaft 240 and the lever 241 thereby downward into engagement with the micro-switch 195. Provision is also herein made for bypassing the operation of the microswitch 195 during the return motion of the cage 73 in order that it will return to its rest or receiving position without undue delay.

Closure of micro-switch 195 completes the circuit from supply line 174, lines 193 and 194 through bar 191 and contacts 192 of relay switch 182 and by line 215 from said switch to the solenoid valve 214 thence by lines 249, 189 and 183 to the source 184. As previously described, this valve operates, when the solenoid thereof is active, to partially or completely restrict fluid flow through the conduit 212; therefore, when the solenoid becomes energized, said valve will close to reduce the volumetric displacement of fluid between the forward and rear areas of cylinder 200 to the capacity of the conduit 209. The pressure directed to cylinder 199 will accordingly be restricted and will move the piston rod 202 more slowly as the central area of the sandwich passes between the rolls 71 and 72.

When the roller 247 of lever 242 rides downwardly from the raised cam area 248, the lever will rock the shaft 240 and lever 241 so as to release the micro-switch 195 from engagement. This will operate to de-energize the circuit of the solenoid of valve 214 and consequently again allow fluid flow through conduit 212. The cage 73 will accordingly resume its more rapid rate of rocking motion during the interval in which the following upwardly-rising end area of the sandwich passes through and emerges from the pressing area of the rolls 71 and 72. It is also to be noted that, as the sandwich leaves the vicinity of these rolls, its engagement with the roll 168 of frame 163 will cease thereby allowing the adjacent end member 165 to become disengaged from the micro-switch 172 to open the same.

At the end of the pressing operation and rocking motion of the cage 73, or when it reaches a position substantially as shown in FIG. 11, the sandwich will have been bodily received on the take-off conveyor 23 and the endless conveyor 41 thereof will be moving said sandwich outwardly toward the area of its removal either by a subsequent line conveyor or manually. Since the conveyor 23 is adapted to swing angularly downward, as previously set forth in connection with the construction of the conveyors 21 and 23, the weight of the sandwich will cause it to temporarily assume an inclined position and, in some instances, one such as is shown in broken line in FIG. 11.

Since the micro-switch 172 has been opened, the cage 73 will remain at the farthest extent of its rocking motion when the solenoid 179 of relay switch 181 becomes de-energized and the spring 250 therein causes the bar 185 to disengage the contacts 186 thereby rendering the valve 188 inactive and allowing the same to return to a neutral position. This will remove the application of pressure to the cylinder 199. Also the solenoid 180 of relay switch 182 will become de-energized.

At the lowest point in its downward swinging motion, the conveyor 23 causes a normally open micro-switch 251 to become closed. This switch is adjustably supported on a bracket 252 mounted on a side member 27 by thread rods 252′ having lock-nuts 253 located thereon which bracket also pivotally supports a clapper plate 253′. Engagement with the switch is made by means of an adjustably mounted bolt 254 carried in a plate 255 secured to a side member 30 of the conveyor 23. As the conveyor descends, the bolt 254 is carried into engagement with the plate 253′ to depress the plunger of the micro-switch. Obviously, the elevation of the switch 251 may be altered by raising or lowering bracket 252 along threaded rods 252′ according to the actual amount of descent of the take-off conveyor 23.

This switch is connected by supply line 174 to the source 176 and by line 256 to the solenoid 196 of relay switch 182 and thence by lines 257 and 190 to the opposite source 184. The solenoid 196, when energized, causes the bar 191 to disengage contacts 192, engage the contacts 197 of switch 182 and complete a circuit from supply line 174 and lines 258 and 259 to a timer 260 which is conventionally connected to the sources 176 and 184 as by lines 261 and 262. The timer is suitably adjusted to delay the return rocking motion of the cage 73 until the sandwich has been moved on the conveyor 23 sufficiently to clear the area of the cage and to then complete a circuit by line 263 to the solenoid 264 of a relay switch 265 and thence by lines 266 and 189 to the source 184. The solenoid causes the bar 267 to engage contacts 268 and close a circuit from supply line 174 through line 269 to line 270 and to the opposite side of the four-way valve 188. This circuit is completed by lines 271 and 189 to the source 184. This will operate to reverse the direction of pressure to the cylinder 199.

*Complete Operation*

Referring now to the operation of the pressing apparatus, it will be initially assumed that the entry conveyor 21 and the take-off conveyor 23 are located in substantially horizontal planes as determined by the balancing influence of their associated ballasts 51 and the engagement of the bolts 56 with one of the side members 30 of their respective frames 29. The cage 73 containing the pressing rolls 71 and 72 will also be disposed as illustrated in FIG. 8 and this position of angularity will have been determined by the plane in which a glass-plastic sandwich will approach the rolls when it is supported on the guide member 65. The member 65 is also located in the selected notches 68 of the bars 69.

Now as a sandwich S is delivered to the pressing apparatus, it is received on the tubular surfaces of the bars 42 of the conveyor 41 in the entry conveyor 21. This conveyor 41 is continuously operated by the chains 40 trained about sprockets 36 and 38, the sprockets 36 on shaft 33 being driven by the transmission unit 44 through sprockets 47 and 48 and chain 46. Also the rolls 71 and 72 of the pressing assembly 22 and the take-off conveyor 23 will be operated from the shaft 33 of conveyor 21 by sprocket 49 and chain 50, the chain 50 being trained about sprocket 135 to drive said rolls and about sprocket 139 to drive the shaft 33 of the take-off conveyor 23.

The sandwich, as it proceeds forwardly, causes the conveyor 21 to swing downwardly and the leading end of the sandwich is carried onto the guide member 65. The sandwich bodily is then supported in part by the conveyor 41 and in part by the member 65 and the continuing forward movement produces an upward transitional movement of the leading area along a plane tangential to each of the rolls 71 and 72. In order to restrict the downward swinging movement of the entry conveyor 21 and halt the same at a predetermined elevation, the flange 60 is engaged by an adjacent side member 30 of the conveyor frame 29. The entry conveyor 21 will accordingly stop in a position substantially as shown by broken line in FIG. 8.

After entry of the leading area of the sandwich into and past the pressing area of the rolls 71 and 72, the driving connection of the roll 72 causes the sandwich to be moved therethrough independently or in combination with the moving conveyor 41, such movement being in each case at the same rate of speed. As previously disclosed, the roll 72, or the pairs of rollers 86 thereof, is driven by means of the sprockets 119 on axles 87, the chains 127, the sprockets 126 and 130 on shaft 92 and the chain 134 trained about sprocket 130 and complementary sprocket 133 on shaft 132 which at its outer end carries the sprocket 135 driven by the chain 50.

As the leading end of the sandwich emerges from between the rolls 71 and 72, it moves against and swings the shaft 167 of frame 163 so that an end member 165 thereof moves against and closes the micro-switch 172. Now, by supply lines 174 and lines 177 and 178, a circuit will be completed first through the solenoid 179 of relay switch 181 to close bar 185 and contacts 186. This closes a circuit by lines 174 and 187 to the four-way valve 188 whereupon said valve will direct pressure from supply pipe 208' by conduit 207 to the rear end of cylinder 199 and against piston 204. This produces outward motion of the piston rod 202 at a rate of speed determined by the displacement of fluid by the piston 206 through the conduits 209 and 212 from the forward end of the cylinder 200 to the rear end thereof. Since the solenoid valve 214 is inactive and open, fluid flow will be equally through conduits 209 and 212. Closure of the switch 172 also by line 178 energizes the solenoid 180 of relay switch 182 to engage bar 191 and contacts 192 thereby completing the circuit from supply line 174 to lines 193 and 194 and to one side of the normally open micro-switch 195.

As the piston rod 202 moves outwardly, it swings the rock-shaft 220 by the associated lever 219 so that the sprocket 222 on the shaft and by chain 224 will cause sprocket 223 on the stub-shaft 82 of the cage 73 to begin to swing the cage. Preferably, as determined by the upwardly-rising leading area of the sandwich, the swinging motion imparted to the cage is rapid and is continued until, for example, substantially a quarter of the length of the sandwich has passed between the rolls. The extent of this movement is also evidenced in the traversing of the roller 247 of lever 242 on the lower peripheral edge of the cam plate 246. However, as the shaft 220 is gradually rotated, the roller rides upwardly onto the cam area 248 and causes the lever 242 to swing the shaft 240 and the lever 241.

The lever 241 now closes micro-switch 195 to complete a supply circuit by line 215 to the solenoid valve 214 to close the same. The decreased volume through conduit 209 imposes a resistance to movement of the piston 206 in cylinder 200 with a resultant slower movement of the piston rod 202 with the piston 204 in cylinder 199. Rocking of the shaft 220 and the cage 73 proceeds more slowly as the central span or areas of the sandwich is pressed by the rolls 71 and 72.

The roller 247 of lever 242 in riding downward from the cam area 248 of the cam plate 246 causes the shaft 240 to rotate and carry the lever 241 out of engagement with the micro-switch 195 allowing the same to open. This action opens the circuit between lines 194 and 215 to the solenoid valve 214 whereupon said valve again opens to increase fluid flow through conduits 209 and 212. A more rapid rate of movement is now imparted to the piston rod 202 since movement of the piston 206 thereon will be preceptibly speeded up.

As the cage swings between the positions shown in FIGS. 8 and 11, the sandwich progressively is moved more and more toward and onto the take-off conveyor 23. In fact, when the cage 73 is positioned at a mid-point as shown in FIG. 14 the sandwich may be entirely removed from the entry conveyor 21 and will be bodily swung until the leading area is deposited on the conveyor 23.

During movement of the last quarter of the length of the sandwich between rolls 71 and 72 the same rapid rate of swinging movement is accorded the cage 73 which movement continues until the following area of the sandwich leaves the pressing area of the rolls. As the sandwich reaches a position on the conveyor 23 as shown by broken line in FIG. 11, it has moved sufficiently to disengage the shaft 167 of the frame 163 whereupon the micro-switch 172 is allowed to open. The circuit of lines 174 and 187 will now be broken as the spring 250 of switch 181 moves the bar 185 from contacts 186. When de-energized, the valve 188 returns to a neutral position and the transmission of pressure from pipe 208' to the conduit 207 is terminated.

When the take-off conveyor 23 reaches the lowest point of swinging downward under the weight of the sandwich, the bolt 254 carried thereby strikes the clapper plate 253' to close micro-switch 251. This closes the circuit through lines 174 and 256 to solenoid 196 of relay switch 182 and by the bar 191 and contacts 197 establishes the circuit by lines 258 and 259 to the timer 260. In moving to engage the contacts 197, it will be noted that the bar 191 is disengaged from contacts 192 thereby opening the circuit of micro-switch 195 between lines 193 and 194 to render the same ineffective. After a suitable delay interval, said timer initiates a circuit to the solenoid 264 of relay switch 265 so that a circuit from lines 174 and 269 through bar 267 and contacts 268 to line 270, to the opposite side of the four-way valve 188.

Said valve now directs pressure from supply pipe 208' to conduit 208 leading to the forward end of cylinder 199 through end cap 203. The pressure against piston 204 causes the same to carry the piston rod 202 rearwardly and since the valve 214 is now open, displacement of fluid in the cylinder 200 and through conduits 209 and 212 will be at the so-called accelerated rate.

As the piston rod is moved rearwardly, it swings the lever 219 to rock the shaft 220 and through the sprockets 222, 223 and chain 224 swing the cage 73 rapidly back to its rest or receiving position. The shaft 220 in being rocked also causes the roller 247 to follow the cam contour of the plate 246 in reverse order. However, since the bar 191 and contacts 192 of relay switch 182 are then disengaged, the resultant closing and opening of the switch 195 will be without result to operate the solenoid valve 214 in its previous open and closed cycles. When the cage 73 arrives at its original rest position, the overall timing of which is calculated by the setting of the timer 260, the circuit therethrough is opened to de-energize the solenoid 264 of relay switch 265. The spring 272 of this switch will then separate the bar 267 and contacts 268 to open the circuit by line 270 to the valve 188. Upon returning to its neutral positon, the valve will close off pressure to the cylinder 199 and control of the pressing cycle will be terminated.

As the equilibrium of the conveyor 23 becomes gradually restored, the same swings upwardly while carrying the sandwich forwardly until, when supported in a substantially horizontal plane, it is removed from the take-off conveyor 23 and the pressing apparatus generally.

As commented on during the description of the pressing assembly 22, the rolls 71 and 72 each consists of a plurality of pairs of rollers 86. These are supported on axles 87 carried at their ends by screws 100 in a cradle 89. The cradle is axially supported, in transverse alignment with the axle 87, on screws 93 within a yoke 90. In turn, the stirrups 88 which consist of the cradle and yoke are supported in the case of the roll 81 on the rod 91 and in the case of the roll 72 on the shaft 92. As well, the vertically related stirrups are tied together by means of the bars 140 and 141 and tie-rod 152 through the straps 146 and the links 150 associated with the stirrups. This substantially universal supporting of the stirrups and their interconnection for movement in unison is not especially used in connection with the pressing of all types of glass sheet and plastic laminae. In fact a great deal of laminated glass thus processed has no transverse curvature and is bent only in its longitudinal axis. However, in the event that a "cross-bend" is made during the shaping of the glass sheets, it may be satisfactorily pressed in an apparatus as embodied in the present invention.

When a glass-plastic sandwich having a transverse or "cross-bent" curvature is to be pressed, the rolls 71 and 72 are already adapted to accommodate them. As the sandwich passes therebetween and the individual pairs of rollers 86 are forced to move in a plane normal to that of their tangency as shown in FIG. 18, the rollers of the roll 71 may be caused to rise and move from their common axial alignment as the stirrups 88 thereof pivot on the rod 91. This movement is transmitted through the upper bar 140, tie-rod 152 and lower bar 141 to the opposed pair of rollers 86 of roll 72 and then associated stirrups 88 pivot on the shaft 92. Simultaneously with this motion, the rollers 86 above and beneath the glass sheets act to assume the plane of the glass surfaces and in so doing bring their supporting axle 87 into substantial parallelism therewith. Since the axle in each case is carried within the associated cradle 89, said cradle will swing on the related screws 93 to easily accomplish this purpose. Also when the sandwich has moved from the rolls 71 and 72, the springs 159 associated with each tie-rod 152 will operate to return the stirrups 88 to their normal positions so that the contacting surfaces of the opposed rollers 86 will again be located in alignment with the axes of the stub-shafts 81 and 82.

In order that a pressing apparatus, of the character herein set forth, will be adapted to perform the preliminary pressing of conically bent glass sheets together with the plastic interlayer, provision is made for permitting the cage 73 to simultaneously swing about vertical and horizontal axes. As shown in FIGS. 12, 22, 23 and 24, the roller bearing 83 is located on the stub-shaft 81 of the cage 73 and operates to support the cage by stub-shaft 81 on the frame member 26.

The crank assembly 85 is adapted to restrain the stub-shaft 81 from movement by means of a conventional toggle arrangement such as is shown in FIGS. 22, 23 and 24. More particularly, this assembly includes a slotted plate 273 mounted on the end of the stub-shaft 81, a slide-member 274 movable in the slot 275 of plate 272, and a radius arm 276 pivotally carried by block 277 on a vertical frame member 25.

The plate 273 is equipped with an annular plug 278 that is fixedly secured in the end of shaft 81 by means of a pin 279. As shown in FIG. 23, the plate is substantially U-shaped and the upwardly rising part 280 has the slot 275 formed therein. The slide member 274 may be formed by two similar blocks having opposed areas of reduced width received in the slot. The similar blocks are interconnected by a special shoulder screw 281 which, outwardly of the slide-member carries a flanged sleeve 282 and spacer 283. The radius arm 276 is loosely supported on the sleeve 282. The threaded end of the screw 281 is equipped with lock-nuts 284 which operate, when turned against the spacer 283, to draw the assembly of slide-member 274, sleeve 282 and spacer 283 tightly together. Upon releasing the nuts 284, the component blocks of the slide-member will separate sufficiently to permit the same to be slid along the slot 275. Thus when slide-member 274 is positioned as shown in FIG. 23, the axis of screw 281 will be aligned with the axes of stub-shafts 81 and 82 and through the radius arm 276, the roller bearing 83 will be restrained from movement. However, when the slide-member is positioned as shown in FIG. 22, there will be a radial distance between the axis of screw 281 and the axis of stub-shaft 81. The radius arm 276, when the slide-member is so located, combines with the plate 273 to effect a toggle arrangement. Thus when the stub-shaft 82 is rotated by the sprocket 223 through chain 224 from the sprocket 222, the stub-shaft 81 will likewise be rotated. Since the plate 273 is rigidly connected to the said stub-shaft, said plate will now swing radially about the axis of screw 281 and in so doing will carry the stub-shaft 81 in a theoretically arcuate course. The course of movement by the shaft will however be along a substantially horizontal plane inasmuch as the shaft is supported by the roller bearing 83 on frame member 26. When it becomes necessary to press conically bent glass sheets and the support is so located, the securing bolts of the pillow bearing 84 are slightly loosened.

Now, with the cage 73 angularly positioned as shown in FIGS. 8 and 22, the rocking motion of said cage, as produced by the air-motor 198, is started so that when the extreme corner of the leading area of the conically bent sandwich enters between the rolls 71 and 72, rotation of the stub shafts 81 and 82 and their consequent movement as determined by the plate 273 and radius arm 276 will carry the rolls to a position of transverse registry with the leading edge of said sandwich and the cage 73 will be bodily swung about a vertical axis as the roller bearing 83 rides on the frame member 26 as indicated by an arrow V. This will move the cage out of the normal transverse position with respect to the longitudinal axis of the apparatus. Thus, as the cage 73 is rocked or swung in the manner already described in the direction of the arrow H, it also will gradually swing on the roller bearing 83 until a second angular position is assumed in which the rolls 71 and 72 will be positioned to discharge the following edge of the sandwich in a satisfactory manner.

After completion the production of such forms of conically bent laminae, the axes of screw 281 and shaft 81 are re-aligned by lowering the slide-member 274 relative to the plate 273. Thereafter, the cage of the pressing apparatus will be in position for pressing glass-plastic sandwiches bent in at least one or the longitudinal axis.

In the event that flat or unbent glass-plastic sandwiches are to be pressed, the handled screw 61 is released and the flange 60 is raised until the conveyor 21, in its downward swinging motion, will be stopped when the upper flight of the conveyor 41 is disposed substantially in a horizontal plane with the tangency plane of the rolls 71 and 72 as shown in FIG. 23. The cage 73 and rolls 71 and 72 are then located so that the axles 87 of said rolls will be located in a vertical plane. This may be accomplished by manually operating micro-switch 172 and then opening manual switch 175 when the desired position has been reached. Also by opening switch 175, the entire electrical control system will be rendered ineffective. The flat sandwiches accordingly will be delivered to, passed through the pressing assembly 22 and received by the conveyor 23 in a substantially horizontal path of movement.

It is to be understood that the form of the invention herewith shown and described is to be taken as an illustrative embodiment only of the same, and that various changes in the shape, size and arrangement of parts may be resorted to without departing from the spirit of the invention or the scope of the subjoined claims.

We claim:

1. A method of pressing together the sheets of a glass-plastic sandwich having a sharply curved leading end followed by a relatively flat portion comprising the steps of moving said curved leading end in a defined path toward a pair of rotatable pressing rolls, initially positioning said rolls with the plane tangentially common to both at an acute angle to said defined path, receiving said leading end of the sandwich in a confined passage between said rolls, beginning to swing said rolls rapidly as a unit about an axis located between said rolls and substantially parallel therewith from said first mentioned position to a second position in which the plane tangentially common to both rolls is at an acute angle to a defined path leading from said rolls as said leading end moves into said confined passage, continuing said rapid swinging movement as said sharply curved leading end portion is moving through said passage, and then reducing the speed of said swinging movement to a relatively slower rate during movement of said following relatively flat portion of said sandwich through said passage.

2. A method of pressing together the sheets of a glass-plastic sandwich having sharply curved opposite leading and following end portions and a relatively flat intermediate portion therebetween comprising the steps of moving said curved leading end in a defined path toward a pair of rotatable pressing rolls, initially positioning said rolls with the plane tangentially common to both at an acute angle to said defined path, receiving said leading end in a confined passage between said rolls, beginning to swing said rolls rapidly as a unit about an axis located between said rolls and substantially parallel therewith from said first mentioned position to a second position in which the plane tangentially common to both rolls is at an acute angle to a defined path leading from said rolls as said leading end moves into said confined passage, continuing said rapid swinging movement as said sharply curved leading end portion moves through said passage, then reducing the speed of said swinging movement to a relatively slower rate during movement of said relatively flat intermediate portion through said passage, and finally increasing the speed of said swinging movement to a relatively rapid rate as the following sharply curved end portion moves through said passage and said rolls approach their second position.

3. In apparatus for pressing together the sheets of a curved glass-plastic sandwich, a pair of rotatable pressing rolls providing a confined passage therebetween, a first conveyor means disposed forwardly of said rolls for supporting said sandwich and for moving the curved leading end of said sandwich toward said rolls along a path substantially transversely of the axis of curvature thereof, a second conveyor means disposed rearwardly of said rolls for receiving and supporting the curved leading end portion of the sandwich from between said rolls and for moving the sandwich away from said rolls along a path substantially transversely of the axis of curvature thereof, means mounting said pressing rolls for swinging movement between a receiving position in which the entrance side of said confined passage faces downwardly toward said first conveyor means and a discharge position in which the exit side of said confined passage faces downwardly toward said second conveyor means, means mounting said first conveyor means for swinging movement downwardly into position to permit said curved leading end of the sandwich to be directed into the confined passage between said rolls when in said receiving position, and means for making the downwardly swinging movement of said first conveyor responsive to the movement of said sandwich thereover.

4. In apparatus for pressing together the sheets of a curved glass-plastic sandwich, a pair of rotatable pressing rolls providing a confined passage therebetween, a first conveyor means disposed forwardly of said rolls for supporting said sandwich and for moving the curved leading end of said sandwich toward said rolls along a path substantially transversely of the axis of curvature thereof, a second conveyor means disposed rearwardly of said rolls for receiving and supporting the curved leading end portion of the sandwich from between said rolls and for moving the sandwich away from said rolls along a path substantially transversely of the axis of curvature thereof, means mounting said pressing rolls for swinging movement between a receiving position in which the entrance side of said confined passage faces downwardly toward said first conveyor means and a discharge position in which the exit side of said confined passage faces downwardly toward said second conveyor means, means mounting said second conveyor means for swinging movement downwardly into position to receive and support the curved leading end portion of said sandwich from between said rolls, and means for making the downwardly swinging movement of said second conveyor means responsive to the movement of the curved leading end portion of said sandwich thereon.

5. An apparatus for pressing together the sheets of a rigid curved glass-plastic sandwich, a pair of rotatable pressing rolls providing a confined passage therebetween, a first conveyor means disposed forwardly of said rolls for supporting said sandwich and for moving the curved leading end of said sandwich toward said rolls along a path substantially transversely of the axis of curvature thereof, a second conveyor means disposed rearwardly of said rolls for receiving and supporting the curved leading end portion of the sandwich from between said rolls and for moving the sandwich away from said rolls along a path substantially transversely of the axis of curvature thereof, means mounting said pressing rolls for swinging movement between a receiving position in which the entrance side of said confined passage faces downwardly toward said first conveyor means and a discharge position in which the exit side of said confined passage faces downwardly toward said second conveyor means, means between said first conveyor means and said rolls so positioned in the path of the moving sandwich as to first engage said sandwich at a portion thereof spaced from the leading end and so to lift the rigid sandwich and move the leading end thereof into said confined passage when said rolls are in said receiving position, means for rotating said rolls to move the sandwich through said confined passage, means mounting said second conveyor means for swinging movement downwardly into position to receive and support the curved leading end portion of said sandwich from between said rolls, and means for making the downwardly swinging movement of said second conveyor means responsive to the movement of the curved leading end portion of said sandwich thereon.

6. An apparatus for pressing together the sheets of a rigid curved glass-plastic sandwich, a pair of rotatable pressing rolls providing a confined passage therebetween, a first conveyor means disposed forwardly of said rolls for supporting said sandwich and for moving the curved leading end of said sandwich toward said rolls along a path substantially transversely of the axis of curvature thereof, a second conveyor means disposed rearwardly of said rolls for receiving and supporting the curved leading end portion of the sandwich from between said rolls and for moving the sandwich away from said rolls along a path substantially transversely of the axis of curvature thereof, means mounting said pressing rolls for swinging movement between a receiving position in which the entrance side of said confined passage faces downwardly toward said first conveyor means and a discharge position in which the exit side of said confined passage faces downwardly toward said second conveyor means, means mounting said first conveyor means for swinging movement downwardly into position to permit said curved leading end of the sandwich to be directed into the confined passage between said rolls when in said receiving position, means for making the downwardly swinging movement of said first conveyor responsive to the movement of said sandwich thereover, means between said first conveyor means and said rolls so positioned in the path of the moving sandwich as to first engage said sandwich at a portion thereof spaced from the leading end and so to lift the rigid sandwich and move the leading end thereof into said confined passage, means for rotating said rolls to move the sandwich through said confined passage, means mounting said second conveyor means for swinging movement downwardly into position to receive and support the curved leading end portion of said sandwich from between said rolls, and means for making the downwardly swinging movement of said second conveyor means responsive to the movement of the curved leading end portion of said sandwich thereon.

7. A method of pressing together the sheets of a rigid glass-plastic sandwich having a sharply curved leading end portion followed by a relatively flatter portion, comprising the steps of moving said sandwich with said curved leading end portion in a defined path toward a pair of rotatable pressing rolls, initially positioning said rolls with the plane tangentially common to both at an angle to said defined path, moving the leading end of said sandwich into a confined passage between said rolls by so positioning a member in said defined path as to first engage the moving sandwich at a portion thereof spaced from the leading end and so to lift the sandwich as the leading end reaches said rolls, receiving said leading end of the sandwich in said confined passage between said rolls, beginning to swing said rolls rapidly as a unit about an axis located between said rolls and substantially parallel therewith from said first mentioned position toward a second position in which the plane tangentially common to both rolls is at an angle to a defined path leading from said rolls as said leading end moves into said confined passage, continuing said rapid swinging movement as said sharply curved leading end portion is moving through said passage, and then reducing the speed of said swinging movement to a relatively slower rate during movement of said following relatively flat portion of said sandwich through said passage.

8. A method of pressing together the sheets of a rigid glass-plastic sandwich having sharply curved opposite leading and following end portions and a relatively flatter intermediate portion therebetween, comprising the steps of moving said sandwich with said curved leading end portion in a defined path toward a pair of rotatable pressing rolls, initially positioning said rolls with the plane tangentially common to both at an angle to said defined path, moving the leading end of said sandwich into a confined passage between said rolls by so positioning a member in said defined path as to first engage the moving sandwich at a portion thereof spaced from the leading end and so to lift the sandwich as the leading end reaches said rolls, receiving said leading end in said confined passage between said rolls, beginning to swing said rolls rapidly as a unit about an axis located between said rolls and substantially parallel therewith from said first mentioned position toward a second position in which the plane tangentially common to both rolls is at an angle to a defined path leading from said rolls as said leading end moves into said confined passage, continuing said rapid swinging movement as said sharply curved leading end portion moves through said passage, then reducing the speed of said swinging movement to a relatively slower rate during movement of said relatively flat intermediate portion through said passage, and finally increasing the speed of said swinging movement to a relatively rapid rate as the following sharply curved end portion moves through said passage and said rolls approach their second position.

9. In apparatus for pressing together the sheets of a curved rigid glass-plastic sandwich having a sharply upturned leading end portion, conveyor means for moving the curved leading end of said sandwich in a path substantially transversely of an axis of curvature thereof, a pair of parallel pressing rolls disposed transversely of said path to provide a confined passage therebetween, means mounting said rolls as a unit with the plane tangentially common to both normally arranged above and at an angle with respect to said path to dispose said confined passage in position to receive the leading end of said sandwich, means between said conveyor means and said rolls so positioned in the path of said moving sandwich as to first engage said sandwich at a portion thereof spaced from the leading end and so to lift the rigid sandwich and move the leading end into said passage along said angled plane tangentially common to both of said rolls, and means actuated in response to movement of said sandwich for swinging said mounting means for said rolls about an axis substantially parallel to the axis of curvature of said sandwich during pressing thereof.

10. Apparatus as defined in claim 9 including means for swinging said conveyor means an adjustable distance about an axis substantially transverse to the path of said sandwich.

11. In apparatus for pressing together the sheets of a curved rigid glass-plastic sandwich having a sharply upturned leading end portion, conveyor means for moving the curved leading end of said sandwich in a path substantially transversely of an axis of curvature thereof, a pair of parallel pressing rolls disposed transversely of said path to provide a confined passage therebetween, means mounting said rolls as a unit with the plane tangentially common to both normally arranged above and at an angle with respect to said path to dispose said confined passage in position to receive the leading end of said sandwich, and means actuated in response to movement of said sandwich for swinging said mounting means for said rolls about an axis substantially parallel to the axis of curvature of said sandwich during pressing thereof.

12. In apparatus for pressing together the sheets of a curved glass-plastic sandwich, a pair of rotatable pressing rolls providing a confined passage therebetween, a first conveyor means disposed forwardly of said rolls for supporting said sandwich and for moving the curved leading end of said sandwich toward said rolls along a path substantially transversely of the axis of curvature thereof, a second conveyor means disposed rearwardly of said rolls for receiving and supporting the curved leading end portion of the sandwich from between said rolls and for moving the sandwich away from said rolls along a path substantially transversely of the axis of curvature thereof, means mounting said pressing rolls for swinging movement between a receiving position in which the entrance side of said confined passage faces downwardly toward said first conveyor means and a discharge position in which the exit side of said confined passage faces downwardly toward said second conveyor means, means mounting at least one of said conveyor means for swinging movement downwardly into position to support said sandwich relative to said rolls, and means for making the downward swinging movement of said conveyor means responsive to the movement of said sandwich thereover.

13. Apparatus of the character defined in claim 12 in which means are provided for causing said pressing rolls to conform to the transverse curvature of the leading end of said sandwich along lines substantially parallel to the path of said sandwich as said leading end is directed into said passage.

14. Apparatus as defined in claim 12 in which there is provided means between said first conveyor means and said rolls positioned in the path of the moving sandwich to engage and lift the same and move the leading end thereof into said confined passage when said rolls are in said receiving position.

15. Apparatus as defined in claim 14 in which means are provided for adjusting said means between said conveyor means and said rolls relative to said conveyor means and said rolls.

16. Apparatus of the character defined in claim 13 in which said rolls comprise a series of oppositely disposed individual roller elements mounted for independent movement.

17. Apparatus of the character defined in claim 16 in which means are provided for interconnecting opposite sets of roller elements for coordinated movement one to another.

References Cited in the file of this patent

UNITED STATES PATENTS

| | | |
|---|---|---|
| 2,628,177 | Boicey et al. | Feb. 10, 1953 |
| 2,635,973 | Swindler | Apr. 21, 1953 |
| 2,673,168 | Pascoe et al. | Mar. 23, 1954 |

UNITED STATES PATENT OFFICE
CERTIFICATE OF CORRECTION

Patent No. 3,029,177    April 10, 1962

James H. Boicey et al.

It is hereby certified that error appears in the above numbered patent requiring correction and that the said Letters Patent should read as corrected below.

Column 5, line 44, for "rse" read -- rise --; column 12, line 14, for "74" read -- 84 --; line 34, for "axees" read -- axes --; line 60, for "boldly" read -- bodily --; line 70, for "consequences" read -- consequence --; column 17, line 16, for "relatively" read -- releasably --; column 21, line 15, for "81" read -- 71 --.

Signed and sealed this 28th day of August 1962.

(SEAL)
Attest:

ESTON G. JOHNSON

Attesting Officer

DAVID L. LADD
Commissioner of Patents